(12) United States Patent
Lester et al.

(10) Patent No.: US 12,325,173 B2
(45) Date of Patent: Jun. 10, 2025

(54) ARTICLE WITH VISUAL EFFECT

(71) Applicant: The Procter & Gamble Company, Cincinnati, OH (US)

(72) Inventors: Joseph Craig Lester, Liberty Township, OH (US); Nicole Ashley Rizzo, Cincinnati, OH (US); Marc Andrew Mamak, Mason, OH (US); Joseph Henry Nurre, West Chester, OH (US); Philip A. Sawin, Wyoming, OH (US); Jeffrey Thomas Grothaus, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 566 days.

(21) Appl. No.: 17/703,123

(22) Filed: Mar. 24, 2022

(65) Prior Publication Data
US 2022/0339847 A1    Oct. 27, 2022

Related U.S. Application Data

(60) Provisional application No. 63/178,568, filed on Apr. 23, 2021.

(51) Int. Cl.
*B29C 49/48* (2006.01)
*B29C 49/04* (2006.01)
*B29L 23/00* (2006.01)
*B65D 1/02* (2006.01)

(52) U.S. Cl.
CPC .......... *B29C 49/4802* (2013.01); *B29C 49/04* (2013.01); *B65D 1/0215* (2013.01); *B29L 2023/22* (2013.01)

(58) Field of Classification Search
None
See application file for complete search history.

(56) References Cited

U.S. PATENT DOCUMENTS

| | | | |
|---|---|---|---|
| 2,669,752 | A | 2/1954 | Pratt |
| 3,674,512 | A | 7/1972 | Andros |
| 4,233,262 | A | 11/1980 | Curto |
| 4,339,409 | A | 7/1982 | Curto |
| 4,641,758 | A | 2/1987 | Sugiura |
| 5,312,572 | A | 5/1994 | Horwege |

(Continued)

FOREIGN PATENT DOCUMENTS

| | | |
|---|---|---|
| CN | 1953862 A | 4/2007 |
| CN | 102026793 A | 4/2011 |

(Continued)

OTHER PUBLICATIONS

WO-2019065849-A1 Eng trans (Year: 2019).*

(Continued)

*Primary Examiner* — Jeffrey D Washville
(74) *Attorney, Agent, or Firm* — Kathleen Y. Carter

(57) ABSTRACT

Article having a body portion including one or more walls surrounding an interior space. The one or more walls have an inner surface, an outer surface, a wall thickness, a transparent portion, and one or more aesthetic regions having oblong voids provided between the inner surface and the outer surface within an outermost 70% of the wall, and the one or more aesthetic regions are provided in a predetermined pattern.

8 Claims, 17 Drawing Sheets

(56) References Cited

U.S. PATENT DOCUMENTS

| | | | |
|---|---|---|---|
| 5,397,610 | A | 3/1995 | Odajima et al. |
| 5,840,386 | A | 11/1998 | Hatch et al. |
| 5,894,041 | A | 4/1999 | Cornell |
| 7,763,179 | B2 | 7/2010 | Levy |
| 8,522,989 | B2 | 9/2013 | Uptergrove |
| 2004/0144746 | A1 | 7/2004 | Tanaka et al. |
| 2005/0084636 | A1 | 4/2005 | Papenfuss et al. |
| 2005/0255269 | A1 | 11/2005 | Jacobs |
| 2006/0131793 | A1 | 6/2006 | Tanaka et al. |
| 2006/0263554 | A1 | 11/2006 | Yamada et al. |
| 2010/0104697 | A1 | 4/2010 | Kriegel et al. |
| 2011/0089135 | A1 | 4/2011 | Simon |
| 2012/0193320 | A1 | 8/2012 | Stanca et al. |
| 2013/0059102 | A1 | 3/2013 | Torchio et al. |
| 2013/0228249 | A1 | 9/2013 | Gill |
| 2013/0307197 | A1 | 11/2013 | Haesendonckx et al. |
| 2014/0231426 | A1 * | 8/2014 | Ichikawa ............. B65D 1/0207 220/62.11 |
| 2015/0352772 | A1 | 12/2015 | Feuilloley et al. |
| 2016/0375608 | A1 | 12/2016 | Pijls |
| 2017/0204251 | A1 | 7/2017 | Agerton et al. |
| 2018/0305064 | A1 | 10/2018 | Lane et al. |
| 2019/0283919 | A1 | 9/2019 | Mangold et al. |
| 2020/0024021 | A1 | 1/2020 | Agerton et al. |
| 2020/0198212 | A1 | 6/2020 | Rizzo et al. |
| 2020/0198213 | A1 | 6/2020 | Rizzo et al. |
| 2020/0198214 | A1 | 6/2020 | Rizzo et al. |
| 2020/0198829 | A1 | 6/2020 | Rizzo et al. |
| 2020/0198830 | A1 | 6/2020 | Rizzo et al. |
| 2020/0198831 | A1 | 6/2020 | Rizzo et al. |
| 2021/0130571 | A1 | 5/2021 | Wang et al. |
| 2022/0127036 | A1 | 4/2022 | Rizzo et al. |

FOREIGN PATENT DOCUMENTS

| | | | |
|---|---|---|---|
| CN | 102686376 | A | 9/2012 |
| CN | 102933369 | A | 2/2013 |
| CN | 103958178 | A | 7/2014 |
| CN | 104684838 | A | 6/2015 |
| CN | 107405818 | A | 11/2017 |
| EP | 2207722 | A1 | 7/2010 |
| EP | 2832654 | A1 | 2/2015 |
| FR | 2916674 | A1 | 12/2008 |
| FR | 2898293 | B1 | 8/2012 |
| GB | 1110703 | A | 4/1968 |
| JP | H01257024 | A | 10/1989 |
| JP | 2013075465 | A | 4/2013 |
| JP | 2014108796 | A | 6/2014 |
| KR | 20160124241 | A | 10/2016 |
| WO | 9902324 | A1 | 1/1999 |
| WO | 2005115721 | A1 | 12/2005 |
| WO | WO-2019065849 | A1 * | 4/2019 ............. B29B 11/08 |

OTHER PUBLICATIONS

All Office Actions; U.S. Appl. No. 16/720,036, filed Dec. 19, 2019.
All Office Actions; U.S. Appl. No. 16/720,044, filed Dec. 19, 2019.
All Office Actions; U.S. Appl. No. 16/720,047, filed Dec. 19, 2019.
All Office Actions; U.S. Appl. No. 16/720,056, filed Dec. 19, 2019.
All Office Actions; U.S. Appl. No. 16/720,052, filed Dec. 19, 2019.
All Office Actions; U.S. Appl. No. 16/720,072, filed Dec. 19, 2019.
All Office Actions; U.S. Appl. No. 17/569,576, filed Jan. 6, 2022.
Anonymous: "Color difference—Wikipedia", Jan. 1, 2005 (Jan. 1, 2005), pp. 1-5, XP05533558, Retrieved from the Internet:URL:https://en.wikipedia.org/wiki/Color difference.
Unpublished U.S. Appl. No. 17/569,576, filed Jan. 6, 2022, to Nicole Ashley Rizzoet. al.
PCT Search Report and Written Opinion for PCT/US2022/025258 dated Jul. 11, 2022, 18 pages.

* cited by examiner

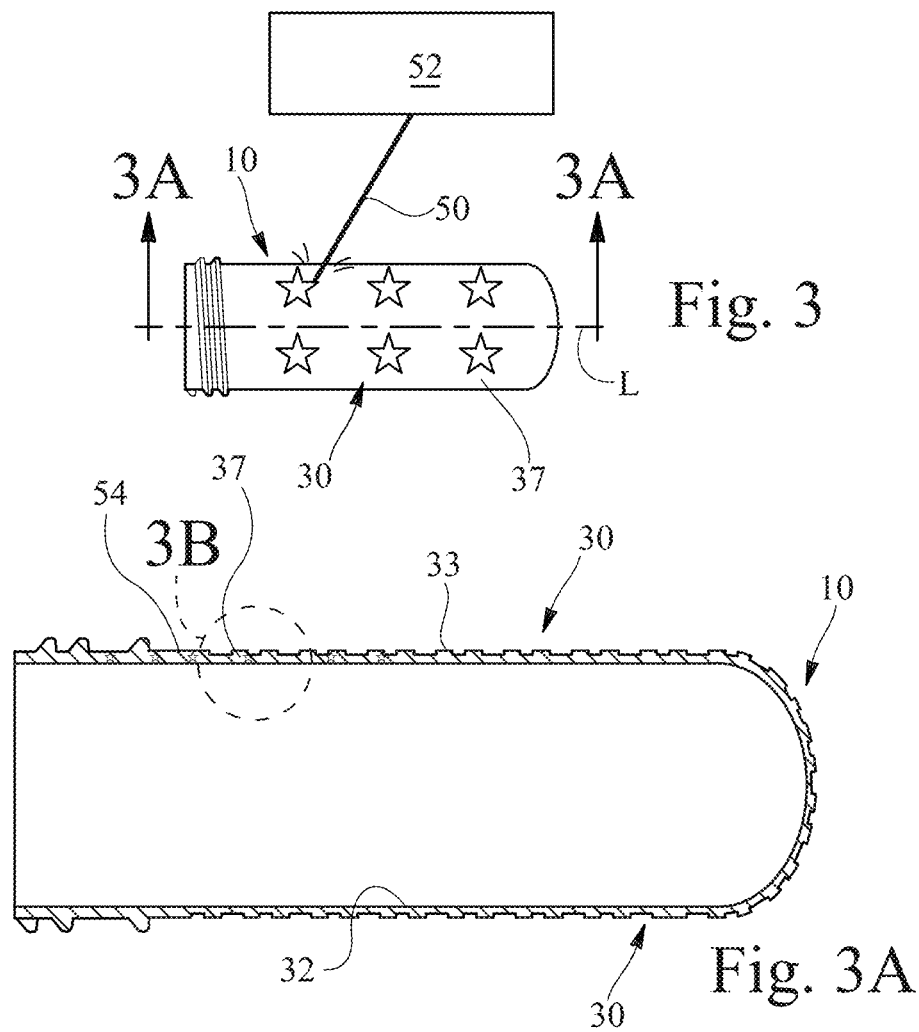
Fig. 3
Fig. 3A
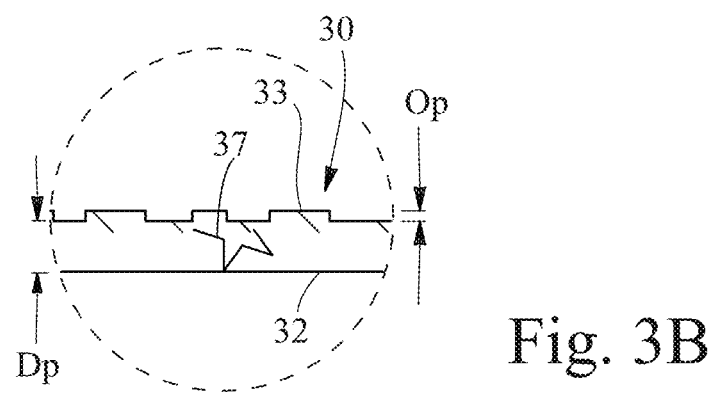
Fig. 3B

Dp

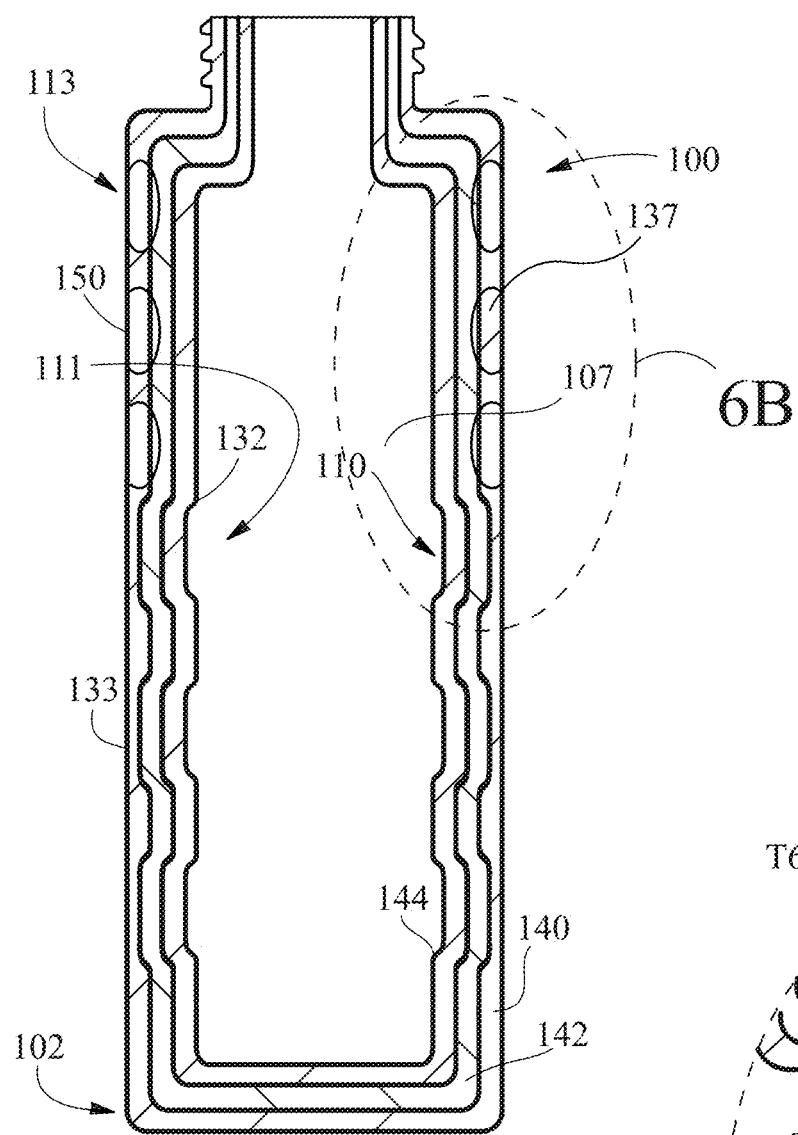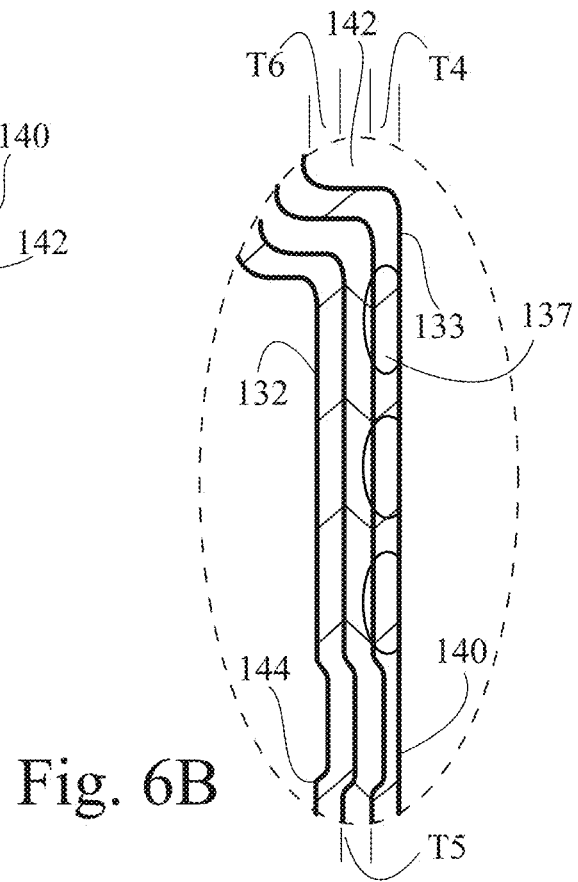
Fig. 6A
Fig. 6B

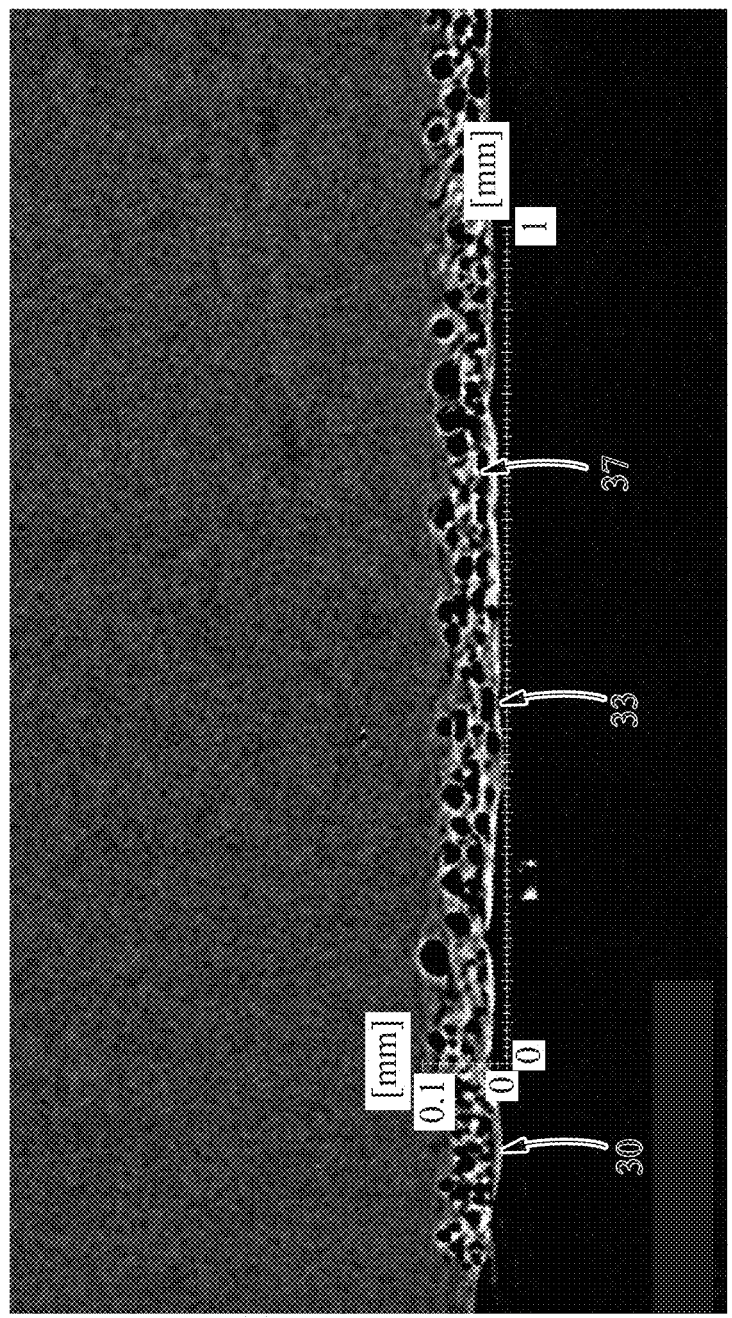

ARTICLE WITH VISUAL EFFECT

FIELD OF THE INVENTION

The present invention relates to articles with unique visual effects, preforms for blow molded articles, and methods for making such articles and preforms.

BACKGROUND OF THE INVENTION

Articles made of thermoplastic materials are popular in various industries, including containers for consumer goods, food and beverages. Blow molded packages, such as bottles, are one popular type of thermoplastic container. Blow molded packages can be made by first creating a preform that is subsequently expanded in a mold, generally with air or another gas under high pressure, to form the resulting article. For certain articles, injection blow molding or injection stretch blow molding is used where the preform is softened and/or stretched while in the mold prior to being expanded into the final article.

Although blow molding has been found to be an effective and efficient process for manufacturing articles such as containers and the like, the requirements of the process can make it difficult to provide articles with certain aesthetic and/or tactile qualities or characteristics. Typical preform manufacturing and blow molding processes often limit the available options for the aesthetic appearance of the outer surface of the article because of the steps required to make preforms, the high cost of the molds for the blow molding process, and the processing requirements needed to blow the preform into the final article.

Thus, it would be desirable to provide improved aesthetic features on blow molded articles. Further, it would be desirable to provide blow molded articles having visual effects such as color, translucence or opacity and/or dimensional visual effects such as the appearance of depth or dimension (e.g. 3D), or texture. It would also be desirable that such blow molded articles do not require the use of additives that may foul a recycling stream for the article. It would also be desirable that such blow molded articles maintain a generally smooth outer surface on the article.

The invention disclosed herein may provide any one or more of the described or other features and/or benefits and such features and/or benefits may be provided separately or in any desired combination.

SUMMARY OF THE INVENTION

A blow molded article is provided. The blow molded article has a body portion including one or more walls surrounding an interior space. The one or more walls have an inner surface, an outer surface, a wall thickness, a transparent portion, and one or more aesthetic regions having oblong voids provided between the inner surface and the outer surface within an outermost 70% of the wall, and the one or more aesthetic regions are provided in a predetermined pattern.

A preform for blow molding an article is also provided. The preform is formed from a thermoplastic material and has a body having one or more walls extending from an opening to a base. The one or more walls have an inner surface, an outer surface, a wall thickness, a transparent portion, and one or more foamed regions provided between the inner surface and the outer surface within an outermost 70% of the wall, the one or more foamed regions being provided in a predetermined pattern.

A method for making a blow molded article from a preform is further provided. The method includes: a) providing a preform of a thermoplastic material, the preform having a body with one or more walls and an opening, the walls having an inner surface and an outer surface; b) foaming at least a portion of the walls of the preform to form one or more foamed regions within an outermost 70% of the wall; and c) stretching the preform to form a blow molded article having an article wall having one or more aesthetic regions having oblong voids, the one or more aesthetic regions being provided in a predetermined pattern within an outermost 70% of the article wall.

BRIEF DESCRIPTION OF THE DRAWINGS

FIG. 2A is a view of a preform depicted in FIG. 1A, showing the cross-section in.
FIG. 3 is a plan view of a preform as it is being foamed by a laser.
FIG. 3A is a cross-sectional view of the preform of FIG. 3 taken through cross-section line 3A-3A after it has been foamed.
FIG. 3B is a cross-sectional view of the preform of FIG. 3 taken through cross-section line 3A-3A after it has been foamed.
FIG. 6A is a cross-sectional view of the article of FIG. 6 taken through cross-section line 6A-6A.
FIG. 6B is an exploded cross-sectional view of the article of FIG. 6 in area 6B.
FIG. 8A is a uCT-scan of a cross-section view of a preform.

DETAILED DESCRIPTION OF THE INVENTION

Figure 1A:
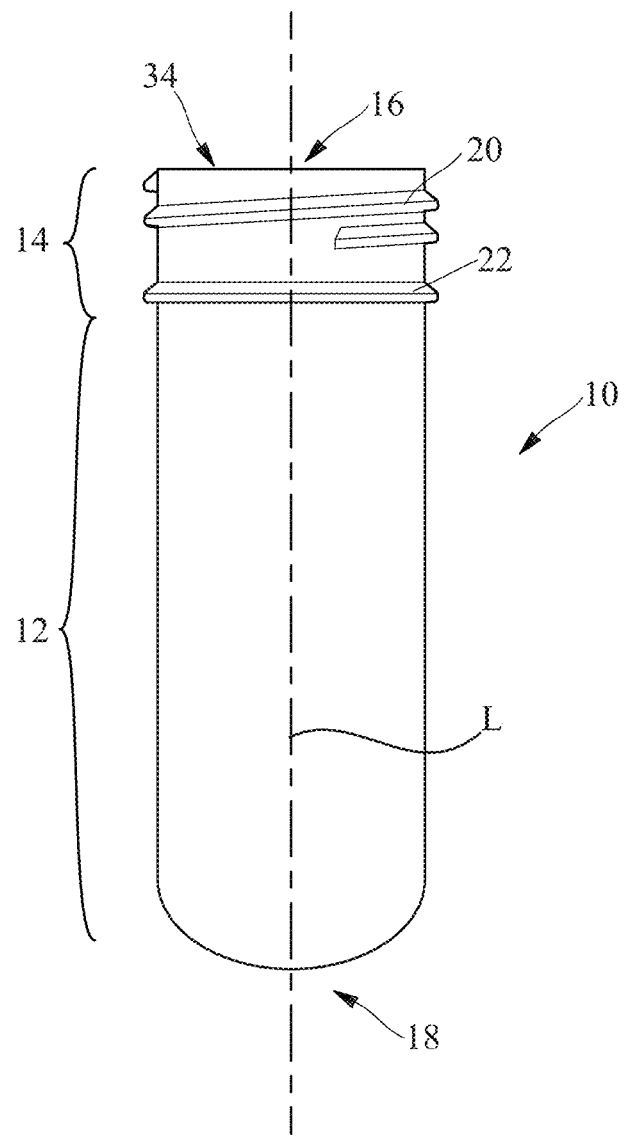
FIG. 1A is a plan view of a preform.

Blow molded articles are popular containers for consumer goods and recyclability of such articles is increasingly important. It may be desirable to provide such blow molded articles with one or more aesthetic features or visual effects, such as, for example, aesthetic features that appear to have some color or translucence or opacity. Such features may be desirable in mono-layer articles or in multi-layer articles and may be desirable whether the outer surface of the article is smooth or textured. Imparting aesthetic features to blow molded articles and to the preforms from which they are formed can be achieved by any of a number of means including the addition of opacifiers, colorants and/or pigments to the preform and/or the article. These pigments, however, can detract from the recyclability of the articles.

Alternately, visual effects such as color, translucence or opacity, pearlescence, luster and/or dimensional visual effects such as the appearance of depth or dimension or texture can be achieved by producing light-scattering effects within the article, such as through the introduction of immiscible materials to the preform (and therefore the article). Examples of such an approach include the introduction of silicones and polymethyl methacrylate into preform made from polyethylene-terephthalate (PET). This approach also can impact the recyclability of the article.

Light-scattering visual effects can alternately be achieved by the introduction of a gas such as air to the preform as in the form of foaming. Such an approach includes streaming air into the injection mold at the time the preform is being fabricated and trapping the air within the preform as a foam as it cools. Such an approach suffers from the disadvantage that the areas of the preform which are foamed cannot be controlled and therefore cannot be used to form a predetermined pattern. Further, the foaming of the entire thickness of the walls of the preform can reduce the barrier properties of finished container.

The present invention describes blow molded articles, preforms, and methods of making a blow molded article from a preform, where the article has one or more aesthetic regions having oblong voids provided between the inner surface and the outer surface within an outermost 70% of the wall. The one or more aesthetic regions are provided in a predetermined pattern. The present invention can use foaming of predetermined portions of a portion of the wall of the preform to form a pattern of foamed regions within an outermost 70% of the wall such that the blow molded article has aesthetic regions having oblong voids. Such blow molded articles can be aesthetically pleasing and recyclable.

"Article", as used herein refers to an individual object for consumer usage, e.g. a container suitable for containing materials or compositions. The article may be a container, non-limiting examples of which include bottles, caps, tubes, drums, jars, cups, and the like and may be blow molded. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. Containers may be used to store, transport, and/or dispense the materials and/or compositions contained therein.

"Blow molding" refers to a manufacturing process by which hollow cavity-containing articles are formed. In general, there are three main types of blow molding: extrusion blow molding (EBM), injection blow molding (IBM), and injection stretch blow molding (ISBM). The blow molded articles of the present invention can be made via EBM, IBM or ISBM, or any other known or developed blow molding method, all of which are referred to herein simply as blow molding. The blow molding process typically begins with forming a precursor structure or "preform" that is ultimately expanded into the final article. The preform, as used herein, can be any shape or configuration, but is often in the general shape of a tube with at least one open end, or two open ends. Examples of preforms include, but are not limited to, parisons (the name often given to precursor structures used in extrusion blow molding), preforms, and other precursor structures used in different blow molding techniques. Preforms, as used herein, can be formed by extrusion, injection, compression molding, 3D printing and other known or developed methods. Injection molding of the preform can be simple injection molding of a single material, co-injection of two or more materials in a single step and/or over-molding performed in two or more steps. The injection step can be closely coupled to a blowing step, as in IBM, 1-step ISBM or 1.5-step ISBM, or can be decoupled in a secondary operation such as in 2-step ISBM. During blow molding, a preform or other precursor structure is typically clamped into a mold and a fluid, often compressed air, is directed into the preform through the opening to expand the preform to the shape of the mold. Sometimes the preform is mechanically stretched prior to or at the same time the fluid is introduced (known as "stretch blow-molding"). Also, the perform may be heated or cooled or both before or after the fluid is introduced. The pressure created by the fluid pushes the thermoplastic out to conform to or partially conform to the shape of the mold containing it. Once the plastic has cooled and stiffened, the mold is opened and the formed article is removed.

As used herein, a "blow molded article" is an article formed by blow molding. Such articles have unique physical and structural attributes that are well known by those of ordinary skill in the art and are not limited by the particular blow molding method or technique used to make the article.

The term "layer" in the context of the present invention means a thickness of material that is generally continuous and typically homogeneous in terms of its chemical makeup. However, it is contemplated that any particular layer may have discontinuities and/or non-homogeneous materials or regions in certain configurations, including but not limited to pigments, effect pigments, dyes, absorbing additives and other materials within the layer.

The term "opaque" as used herein means the material, layer, article, or portion of the article being measured has total luminous transmittance of 0%. The total luminous transmittance is measured in accordance with ASTM D1003.

The term "translucent" as used herein means the material, layer, article, or portion of the article being measured has total luminous transmittance of greater than 0% and less than or equal to 90%.

The term "transparent" as used herein means the material, layer, article, or portion of the article being measured has total luminous transmittance of 90% or more.

Figure 1B:
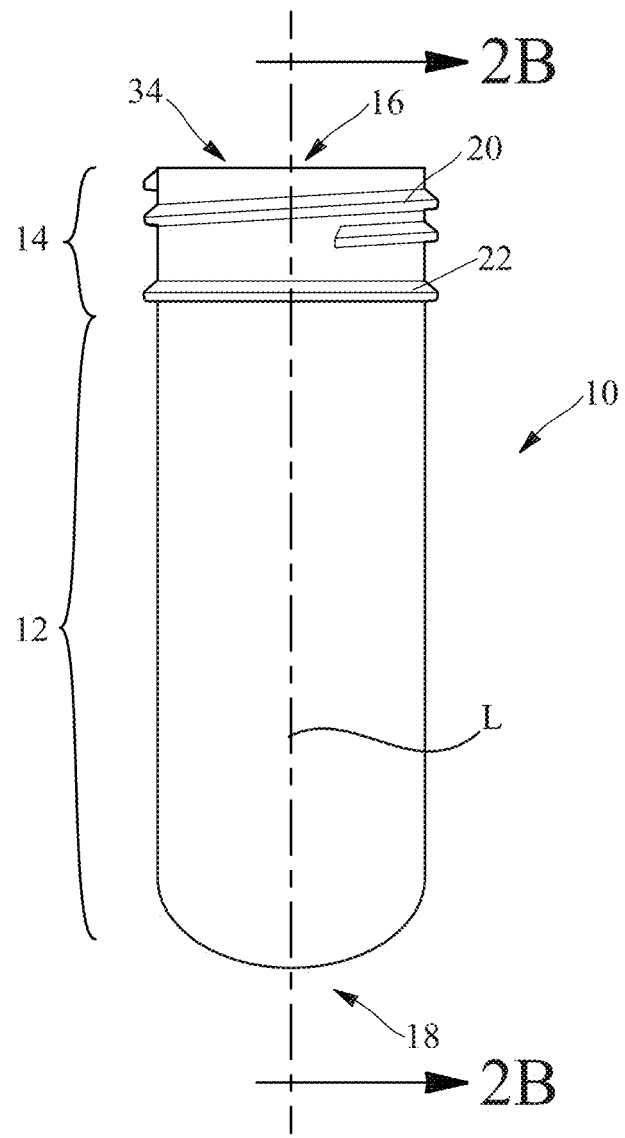
FIG. 1B is a plan view of a multi-layered preform.

Preform:

Exemplary preforms 10 are shown in FIGS. 1A and 1B. The preform 10 has a body 12, and at least one open end 16 having an opening 34. The preform 10 may also include a neck 14, and a closed end 18 disposed opposite of the open end 16. The neck 14 of the preform 10 may include one or more features such as a drain-back feature or an attachment feature such as threads 20 or other structures that can be used in the resulting article to engage with a cap or other closure device. The neck 14 can also include a transfer ring 22 or other structure that can aid in the manufacturing process.

The preform 10 can be used in a blow molding process to provide a preliminary structure that can be transformed into a final article, such as a blow-molded article or bottle, by means of directing a pressurized fluid into the open end 16 of the preform 10 while the preform 10 is disposed in a mold in the shape of the final article (or an interim article). Typically, the preform 10 may be heated or otherwise manipulated mechanically or chemically to soften the material of the preform 10 prior to introduction of the pressurized fluid to allow the preform 10 to expand into the shape of the mold without shattering or cracking. More details relating to exemplary blow molding processes in accordance with the present invention are described below.

Figure 2A:
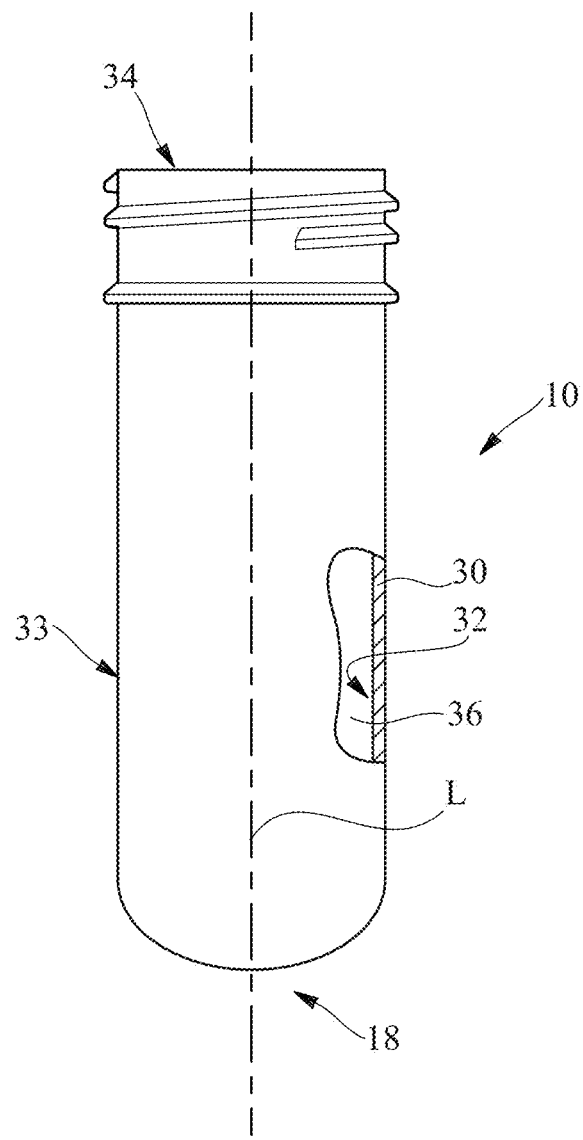

Generally, the preform 10 is formed separately from the blow molding step. The preform 10 can be formed by any suitable method, including but not limited to molding, extrusion, 3D printing, or other known or developed processes. The preform 10 may be formed from a single material or may include layers or regions of different materials. FIG. 2A shows a cross-section of the preform 10. As shown, the preform 10 includes one or more preform walls 30, closed end 18 and interior space 36. The preform walls 30 have an inner surface 32 adjacent the interior space 36 and an outer surface 33 forming the exterior of the preform 10. Typically, but not necessarily, the preform walls 30 are between about 1.0 mm and about 6 mm thick.

Figure 2B:
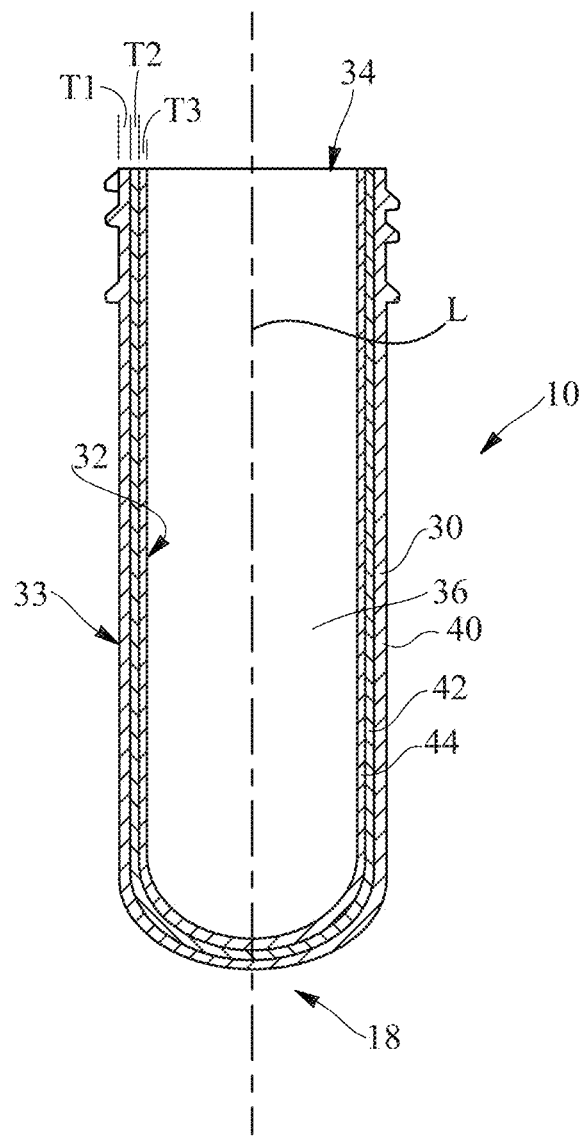
FIG. 2B is a cross-section view of a multi-layer preform taken through 2B-2B as depicted in FIG. 1B.

FIG. 2B depicts a cross-section of the multilayer preform 10 shown in FIG. 1B taken through section line 2B-2B in which the preform walls 30 are shown as having three layers, outer layer 40, intermediate layer 42 adjacent to, but inward from outer layer 40, and inner layer 44. Although three layers are shown, any number of layers can be used, including a single layer, two or more layers, three or more layers or any other number of layers. Also, although in FIG. 2B the layers are shown to extend throughout the entire length of the preform 10, any one or more layers may extend only part way through the preform 10.

The layers 40, 42 and 44 may each have a thickness, T1, T2 and T3. The thickness T1, T2, and T3 of each layer 40, 42 and 44 may be the same or may be different from one or more of the other thicknesses. Further, the thickness of any given layer may change throughout the preform 10. For example, the thickness of any layer may randomly change, may change in a predetermined pattern, may change in the direction of the length of the preform 10 and/or may change about the circumference of the preform 10 walls 30. The layers may be made of the same material or different materials. They may also be the same or different colors or have the same or different luminous transmittance. For example, the outer layer 40 may be transparent and the inner layer 44 or intermediate layer 42 may have a color or be translucent or opaque, although any other combinations of layers with the same or different luminous transmittance are contemplated. By including layers with different colors and/or different luminous transmittance, the article formed from the preform 10 can have interesting and/or unique aesthetic characteristics. In some cases, the preform only has recyclable components. In some cases, the preform may be pigment-free or additive-free, or may only include recyclable additives or pigments.

A preform 10 or article according to the present invention may be formed of a single thermoplastic material or resin or from two or more materials that are different from each other in one or more aspects. Where the preform 10 has different layers, the materials making up each of the layers can be the same or different from any other layer. For example, the preform 10 or article may comprise one or more layers of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof.

Recycled thermoplastic materials may also be used, e.g., post-consumer recycled ("PCR") materials, post-industrial recycled ("PIR") materials and regrind materials, such as, for example polyethylene terephthalate (PCRPET), high density polyethylene (PCRHDPE), low density polyethylene (PCRLDPE), polyethylene terephthalate (PIRPET) high density polyethylene (PIRHDPE), low density polyethylene (PIRLDPE) and others. The thermoplastic materials may include a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin can have a relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials.

The preform 10 can be formed by any known or developed method. For example, the preform 10 can be formed by extrusion, injection, co-injection and/or over-molding as well as less conventional techniques like compression molding, 3D printing or the like. The preform 10 may be formed such that at least a portion of the preform walls 30 includes some texture, e.g. lines, dots, a pattern, and/or indicia, or they may be formed to be smooth. Some of the limitations related to texturing the preform 10 by means of the preform mold can be avoided by the method described herein and/or by 3D printing of the preform.

The preform 10 may be formed with one or more foamed regions 37 formed by a population of bubbles within the preform wall 30 as shown in FIG. 3A. Such foamed regions 37 may be formed on or near the outer surface 33 and/or at a depth within the preform wall 30. The one or more foamed regions 37 are disposed in the outermost 70% of the wall and may include or abut the outer surface. As described herein, "outermost" is defined as the region of the wall furthest from the inner surface of the wall. As such, the outermost 50% of the wall would be the 50% of the wall closest to the outer surface. Generally, foamed regions 37 will be provided in the outermost 70% of the wall, the outermost 60% of the wall, the outermost 50% of the wall, the outermost 40% of the wall, the outermost 30% of the wall, the outermost 20% of the wall, the outermost 10% of the wall, or the outermost 5% of the wall. The foamed region 37 can be open to the outer surface or can be entirely within the wall 30.

The population of bubbles making up the one or more foamed regions 37 may form a gradient in which any property of the population of bubbles may vary within the foamed region. For example, the gradient may include more bubbles (e.g. a higher density of bubbles per unit area or volume) disposed closer to the outer surface 33, or at outer surface 33 when the foamed region 37 includes the outer surface 33. The gradient foamed region may include variations within the population of bubbles making up the one or more of the foamed regions 37 such as the distribution of bubbles, bubble number distribution, bubble volume distribution, bubble dimensions and/or aspect ratio, and the like, through the wall of the preform. The gradient can take any desired shape. For example, the foamed region gradient may be a gradient in the number of bubbles within the foamed region that follows the shape of a gaussian curve, where the foamed region 37 is wider at the outermost boundary and narrower at the innermost boundary. The foamed region may be formed so that there are more of bubbles at the outermost boundary foamed region and fewer bubbles toward the inner surface, as shown in FIG. 3A.

At least the portion of the preform from the midline to the inner surface can be essentially free from any foamed regions. Said another way, the innermost 50% of the preform wall may be essentially free from any foamed regions. Further, the innermost 60%, 70%, 80%, 90%, 95% or greater than 95% of the preform wall may be essentially free from any foamed regions. The predetermined foam pattern may include foamed regions of differing depths within the preform wall. While the disclosure herein generally discusses forming the foamed region(s) in the wall of the preform, the one or more foamed regions 37 may also or alternatively be formed within the preform closed end 18 or neck 14.

The one or more foamed regions 37 may be formed within the preform after the preform has been formed. Examples of ways to create foamed regions 37 within the wall 30 of the preform 10 after it is formed include laser-foaming as described herein. The foamed regions 37 may take on any desired shape and may be in the form of a predetermined pattern including lines, dots, curves, letters, numbers, logos and the like.

FIG. 3 shows an exemplary embodiment of a preform 10 that is being foamed by a beam 50 of laser 52, although any other suitable technique may be employed. The laser beam 50 alters the material, forming the wall 30 of the preform 10 resulting in the one or more foamed regions 37 within the preform wall 30, in the outermost 70% of the wall 30. One advantage of using post-formation modification of the wall 30 of the preform 10 is that there are few, if any, limitations with respect to the particular predetermined pattern 54 that can be chosen for the foamed regions. Further, using post-formation foaming such as laser-foaming can also allow for different preforms 10 from the same mold to have different patterns of foamed regions 37 which can significantly reduce the cost of producing articles with different aesthetic features 112 which, in turn, can make production of small numbers of articles and even customized articles economically feasible.

FIG. 3A is a cross-sectional view of a foamed preform such as the preform of FIG. 3 taken through section line 3A-3A of FIG. 3. The exemplary embodiment shown in FIG. 3A includes a predetermined pattern 54 that includes multiple foamed regions 37. A laser could be used to form foamed region 37 in a portion of the preform disposed inwardly of the outer surface 33, in the outermost portion of the wall 30.

FIG. 3B is a cross-sectional view of the foamed preform of FIG. 3 taken through section line 3A-3A of FIG. 3. The predetermined pattern 54 includes a first foamed region 37A that includes the outer surface 33 of the preform and a second foamed region 37B within the preform wall that does not include the outer surface.

For the purposes of the examples depicted in FIGS. 3-3B, the foamed region 37 can be considered to have been made by laser foaming. However, these examples are not intended to limit the scope of the invention and, as noted above, the foamed region 37 can be formed by any foaming means.

As shown in FIG. 3B, the one or more foamed regions 37 may have a layer-depth Dp and an onset-depth Op. In the Figure, the layer-depth Dp represents the depth (or thickness) of the foamed region 37 in the preform wall 30 in the direction normal to the preform outer surface 33. Where the foamed region 37 includes the preform outer surface 33 (as in FIG. 3A), the foamed region layer-depth can be taken from the preform outer surface. Where the foamed region 37 includes the preform outer surface 33 (as in FIG. 3A), the foamed region onset-depth is zero.

The onset-depth, Op, of the one or more foamed regions 37 may be greater than zero, that is to say, the one or more foamed regions 37 may be formed within the preform wall 30 and that there may be an un-foamed portion of the preform wall outward of the foamed region. The onset-depth of the one or more foamed regions 37 is taken as the distance from the preform outer surface 33 to the foamed region 37 taken in the direction normal to the preform surface.

It would be appreciated that the onset-depth, Op, and/or layer-depth, Dp, of the one or more foamed regions 37 forming the predetermined pattern 54 in the preform may be different from the onset-depth and/or layer-depth of the one or more foamed regions in the resulting article. When forming the article form the preform by, for example, blow-molding, the wall thickness is reduced as the preform is stretched. As such, the onset-depth and/or layer-depth of the one or more foamed regions 37 may be similarly reduced.

It would further be appreciated that the one of more foamed regions 37 in the preform may correspond to one or more foamed regions in the article. Said another way, the image or images depicted by the predetermined pattern formed by the one or more foamed regions in the preform may result in similar depictions in the resulting article wherein the general outline and/or shape of the images are similar between the preform and the article, even if the dimensions of the images have changed due to the stretching of the preform in forming the article.

It would further be appreciated that the onset-depth, Op, and/or the layer-depth, Dp, of the one or more foamed regions may be similar in the preform and the article, relative to the wall thickness of the preform and the article respectively. Said another way, the onset-depth and layer-depth of the one or more foamed regions may be similar in the preform and in the article taken as a fractional portion of the total wall thicknesses of the preform and the article. For example, if a foamed region is formed within the preform wall with an onset-depth that is 10% of the total wall thickness of the preform, the corresponding region within the article wall may also have an onset-depth that is 10% of the thickness of the article wall material.

Typically, the layer-depth, Dp, of the foamed region 37 in the preform 10 is between about 0.001 mm to about 2 mm, but any suitable layer-depth, Dp, can be used. Alternately, the layer-depth of the foamed region can be from about 0.01 mm to about 1.5 mm or about 0.1 mm to about 1 mm, or from about 0.025 mm to about 1 mm, or from about 0.1 mm to about 1 mm or from 0.1 mm to about 0.4 mm. Typically, the onset-depth of the one or more foamed regions in the preform, Op, is between about 0 and 2 mm. Alternately, the onset-depth of the foamed region can be from about 0.01 mm to about 2 mm or about 0.1 mm to about 2 mm, or from about 0.5 mm to about 2 mm, or from about 0.5 mm to about 1.5 mm. Note that the predetermined pattern may include multiple foamed regions that may have the same or different layer-depths and/or onset-depths.

Alternately, the layer-depth of the foamed region can be expressed as a percent of the total wall thickness of the preform in the portion of the preform where it is disposed. For example, the layer-depth of the foamed region may be from about 0.0025% to about 50% of the thickness of the wall of the preform, or from about 0.005% to about 30%, or from about 0.01% to about 30%, or from about 0.025% to about 10% or from 0.1% to about 3% or less. Typically, the onset-depth of the one or more foamed regions in the preform, Op, is between about 0 and 50% of the thickness of the wall of the preform, or from about 0.0025% to about 20% or about 0.005% to about 10%, or from about 0.01% to about 10%, or from about 0.05% to about 5%.

Figure 4:
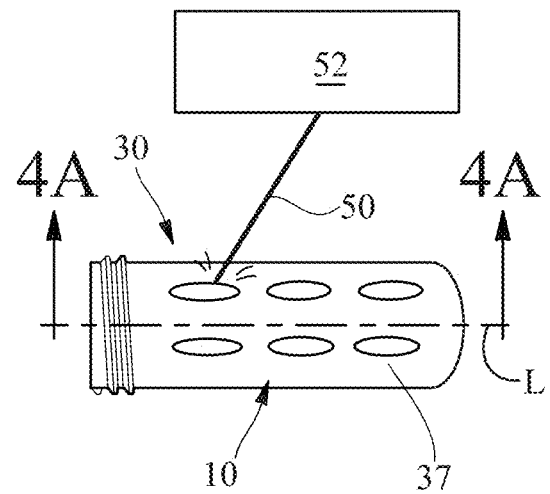
FIG. 4 is a plan view of a multilayered preform as it is being foamed by a laser.

FIG. 4 shows a multilayered preform 10 that is being foamed by a beam 50 of laser 52. The laser beam 50 alters the material, forming the wall 30 of the preform 10 resulting in the one or more foamed regions 37 within the preform wall 30, in the outermost 70% of the wall 30.

Figure 4A:
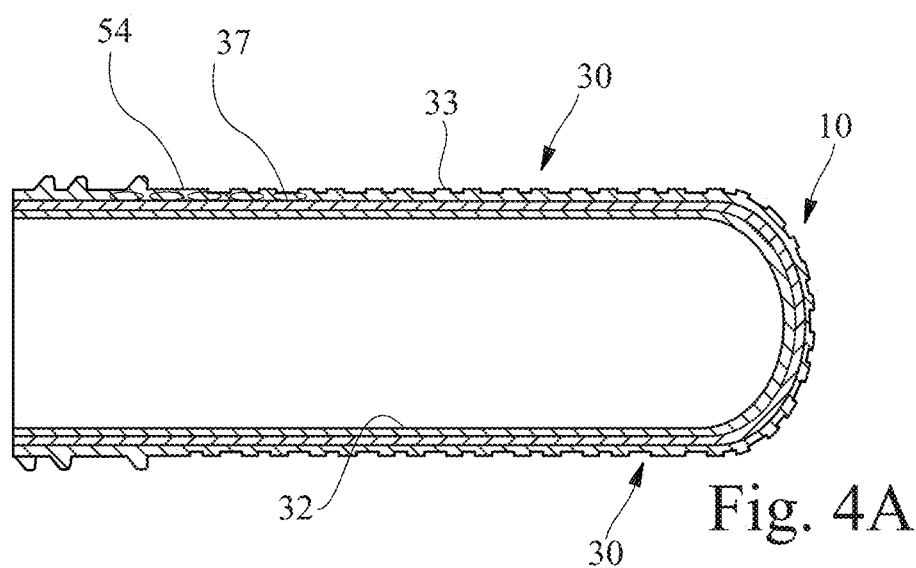
FIG. 4A is a cross-sectional view of the preform of FIG. 4 taken through cross-section line 4A-4A after it has been foamed.

FIG. 4A is a cross-sectional view of the foamed preform of FIG. 4 taken through section line 4A-4A of FIG. 4. FIG. 4A includes a predetermined pattern 54 that includes multiple foamed regions 37. A laser could be used to form foamed region 37 in a portion of the preform disposed inwardly of the outer surface 33, in the outermost 70% of the wall 30, such as in outer layer 40 and in intermediate layer 42.

Laser:

One method to create predetermined pattern 54 of foamed region 37 on the preform 10 is by foaming. Any suitable laser can be used to foam the preform 10. One example of a laser 52 useful for foaming a preform 10 is a UV type laser, having a power in the range of 0.5 to 100 watts and a laser wavelength of 355 or between 200 to 400 nanometers. Such lasers are available from various suppliers, including a ULPN-355-10-1-3-M integrated laser marker from IPG Photonics of Marlborough MA, US. Other makes and types of lasers are also possible and different power ranges and settings may be used. The laser 52 can include optics that can be used to change the energy density, spot size of the laser beam, and focal plane as desired. By adjusting the focal plane of the laser optics, the onset-depth may be positioned from near the surface of the preform to sub-surface depths which can approach the inner preform surface.

Article:

Articles in accordance with the present invention can take on a variety of forms. One form, a blow molded article, such as a bottle, is discussed throughout the specification and shown in the drawings. However, it should be understood that other forms are contemplated, and the scope of the invention should not be considered limited to any particular form or type unless specifically articulated by the relevant claim language.

Figure 5:
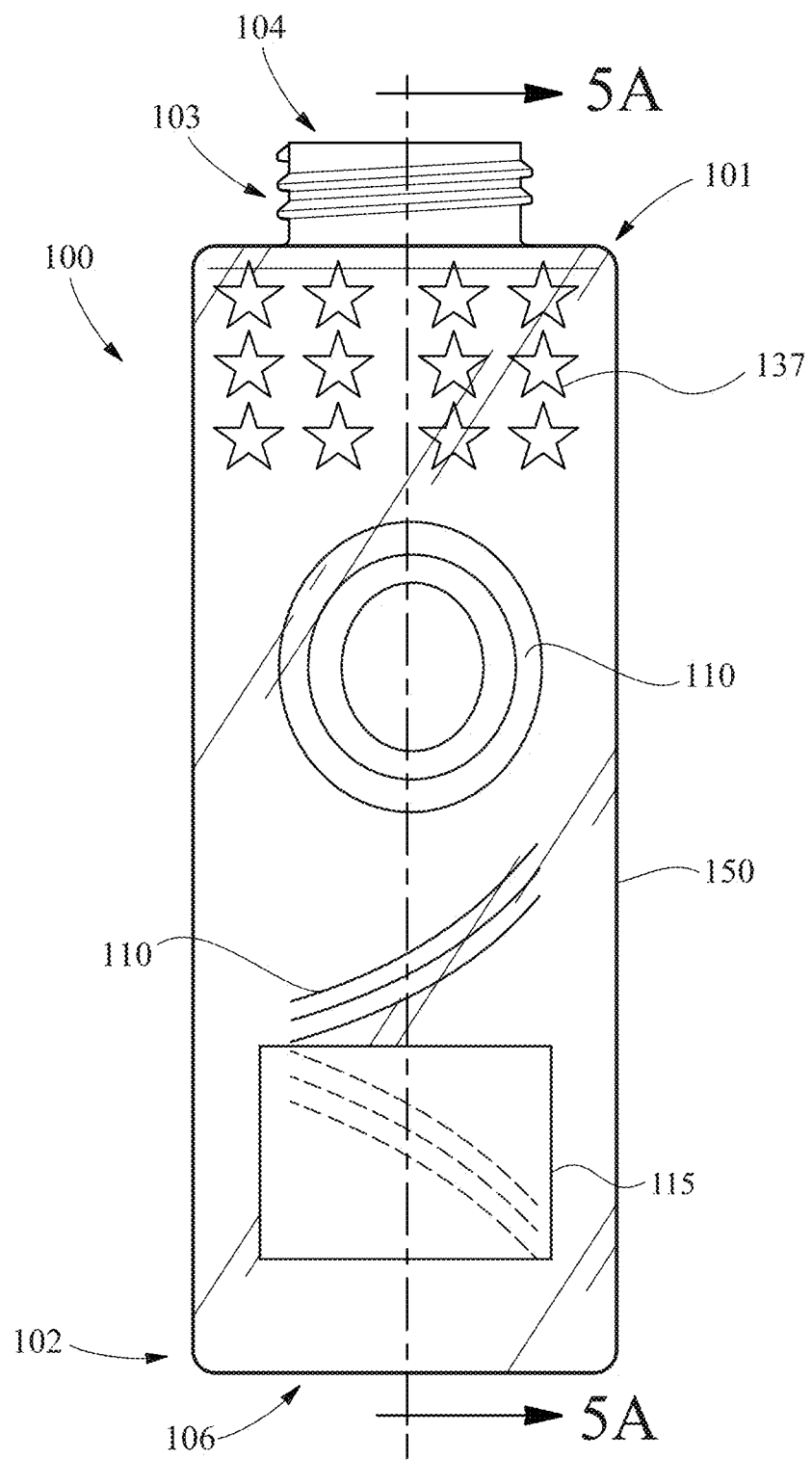
FIG. 5 is a plan view of an article.
Figure 6:
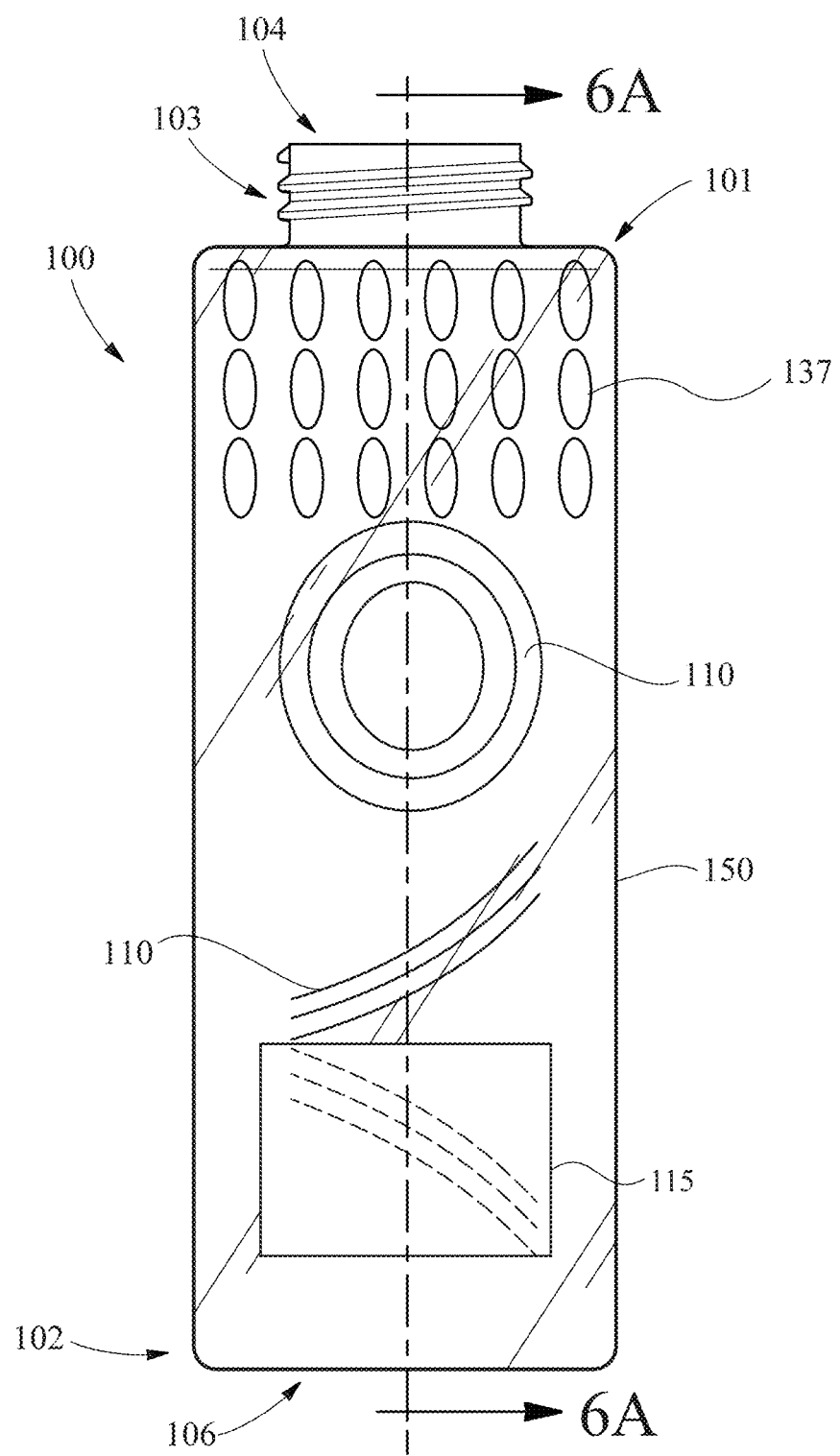
FIG. 6 is a plan view of an article.

Articles 100 may be provided with unique and beneficial characteristics. The characteristics are the result of unique features relating to the structure of the article 100 itself, characteristics of the preform 10, and the method of making the preform 10 and/or article 100. FIGS. 5-6 show examples of blow molded articles 100 in accordance with the present invention. As noted above, the present invention can provide aesthetic features to articles 100 that were heretofore not attainable and/or not attainable with currently available mass production equipment and technology.

For example, as shown in FIGS. 5A-B, 6A-B, the article 100 generally has an article inner surface 132, and an article outer surface 133. The article 100 may include a plurality of aesthetic regions 137 disposed within the wall 150 of the article 100. In addition, as shown in FIGS. 5 and 6, the outer surface 133 of the article 100 or any other surface may be printed with aesthetics and/or indicia 110 including, but not limited to graphics, colors, words, numbers, symbols, etc. Examples of printing techniques include but are not limited to laser printing, ink jet printing, contact printing, screen printing, lithographic printing, transfer printing, labeling and combinations thereof. The articles can maintain their recyclability properties despite including the aesthetic features of the present invention and/or being decorated. Article 100 can include label 115 as shown in FIGS. 5-6.

The walls 150 of the article 100 can be any suitable thickness. For example, the wall thickness may range from about 0.1 mm to about 3.0 mm, although other thicknesses are possible depending on the particular process used and the desired end result.

The articles 100 may have one or more layers of material making up portions or all of the article 100. In multilayer articles 100, as shown in FIGS. 6A and 6B, there may be two or more layers. Also, the relative thickness of the layers, if any, can be different from each other and can vary throughout the particular layer. That is each of the layers may have a thickness that is different from the other layers or some or all may have thicknesses that are approximately the same. Generally, each layer is somewhere between 5% and 95%, 5% and 75%, 5% and 50%, or 5% and 40% of the total thickness of the article wall. And, as noted above, different portions of the walls 150 and/or layers may have different thicknesses, as desired, for example, as shown in FIGS. 6A and 6B, as outer layer 140 having thickness T1, intermediate layer 142 having thickness T2, and inner layer 144 having thickness T3.

Figures 5A, 5B:
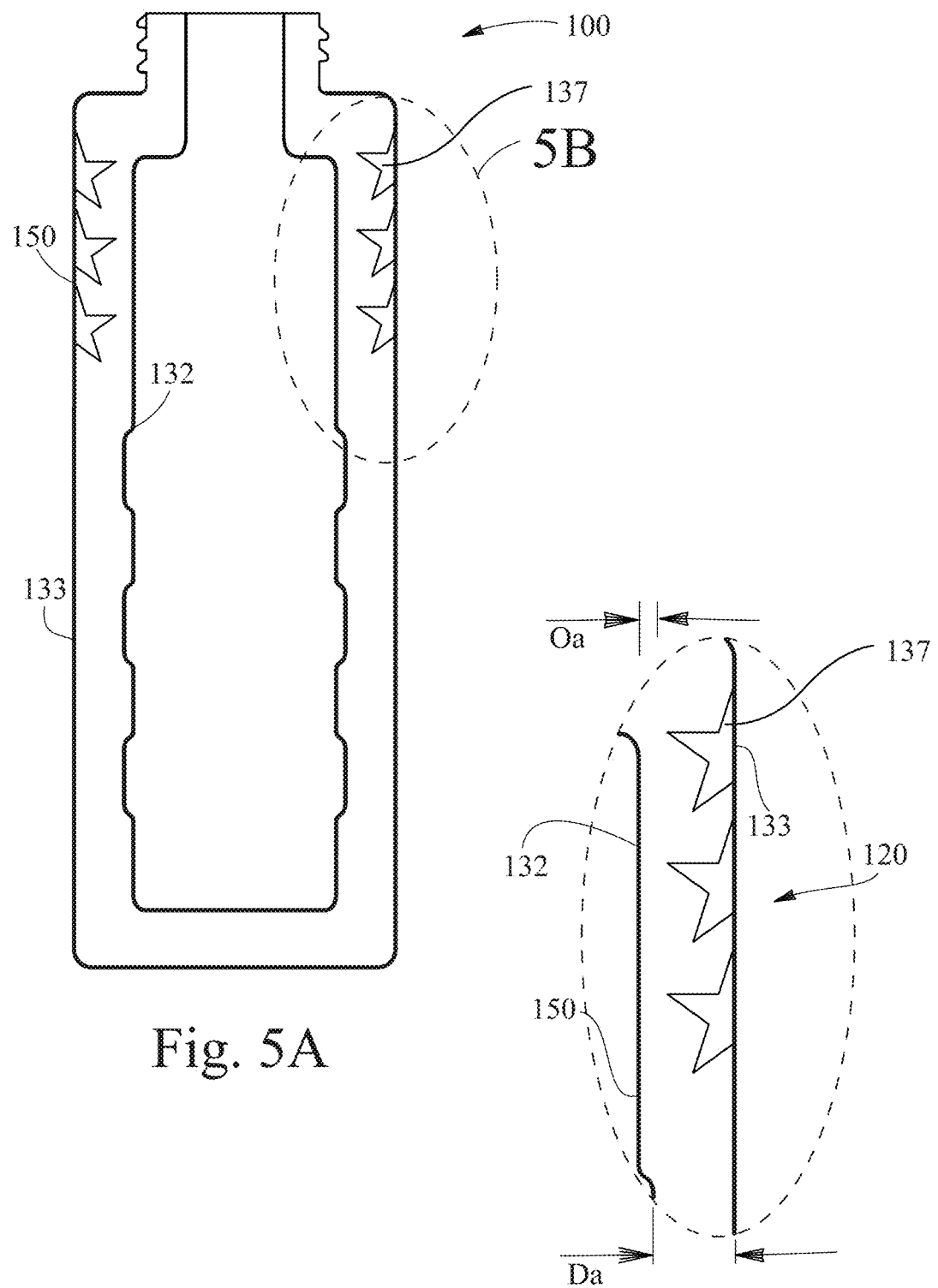
FIG. 5A is a cross-sectional view of the article of FIG. 5 taken through cross-section line 5A-5A.
FIG. 5B is a cross-sectional view of the article of FIG. 5 taken through cross-section line 5A-5A.

One benefit of the present invention is that it allows aesthetic features to be added to blow molded articles that could not otherwise be achieved. This is important because such blow-molded articles made from such blow-molding processes as IBM and ISBM can be made from PET, which is often preferred over other materials because PET is more universally recycled than other clear and glossy thermoplastic materials. The present invention allows for blow molded articles such as articles made by IBM and ISBM processes to be made that have aesthetic features yet do not require additives such as colorants, pigments, immiscible materials, that might detract from the recyclability of the article, to generate the aesthetic features. The article 100 may have a smooth outer surface. As noted above, the articles of the present invention are commonly made from preforms as described previously. The preform 10 may be formed with one or more foamed regions 37 as shown in FIG. 3A, as such the article 100 may include one or more aesthetic regions 137. The bubbles which formed the foamed region in the preform become stretched and distorted when the preform is converted, for example by blowing or stretching, into the article so that they become flattened like pancakes into oblong voids. As such, the aesthetic region 137 may be described as being formed by a population of oblong voids within the article wall 130 as shown in FIGS. 5A and 6A. For example, an individual pattern or design element can be formed by a population of oblong voids within the article wall 130 such that the foamed area forms the pattern or design element. Such aesthetic regions 137 may be disposed on or near the outer surface 133 and/or in the article wall. The one or more aesthetic regions 137 are disposed in the outermost 70% of the wall and may include the outer surface. Generally, aesthetic regions 137 will be provided in the outermost 70% of the article wall, the outermost 60% of the article wall, the outermost 50% of the article wall, the outermost 40% of the article wall, the outermost 30% of the article wall, the outermost 20% of the article wall, the outermost 10% of the article wall, or the outermost 5% of the article wall. The aesthetic regions 137 can be open to the outer surface or can be entirely within the article wall 130.

As noted above, the preform may be foamed within the wall portion or may be foamed within the closed end 18 or the neck 14. Foamed regions formed in the closed end 18 or the neck 14 of the preform can result in aesthetic regions 137 in the article so long as the portion of the preform that includes the foamed region is stretched when the preform is converted to the article.

The population of oblong voids making up the one or more aesthetic regions 137 may form a gradient in which any property of the population of oblong voids may vary within the aesthetic region 137. For example, the gradient may include more oblong voids (e.g. a higher density of oblong voids per unit area or volume) disposed closer to the outer surface 33, or at outer surface 33 when the aesthetic region 137 includes the outer surface 33. The gradient may include variations within the population of oblong voids making up the one or more of the aesthetic regions 137 such as the distribution of oblong voids, oblong void number distribution, oblong void volume distribution, oblong void dimensions and/or aspect ratio, and the like, through the wall of the preform. The gradient can take any desired shape. For example, the gradient may be a gradient in the number of oblong voids within the aesthetic region 137 that follows the shape of a gaussian curve, where the aesthetic region 137 is wider at the outermost boundary and narrower at the innermost boundary. The aesthetic region 137 may be formed so that there are more of oblong voids at the outermost boundary and fewer oblong voids toward the inner surface, as shown in FIGS. 6A-6B. The aesthetic regions can form a predetermined pattern. In addition, the aesthetic regions may generally be contained in the outermost 70% of the article wall.

At least the portion of the article wall from the midline to the inner surface can be essentially free from any aesthetic regions. Said another way, the innermost 50% of the article wall may be essentially free from any aesthetic regions. Further, the innermost 60%, 70%, 80%, 90%, 95% or greater than 95% of the article wall may be essentially free from any aesthetic regions. The predetermined aesthetic pattern may include aesthetic regions of differing depths. The one of more aesthetic regions may be disposed within the article wall or may be disposed within the article closed end or neck so long as there is adequate stretching of the preform in those areas to form the pancakes. The one or more aesthetic regions in the article may form a predetermined pattern. The predetermined pattern may take on any desired shape including lines, dots, curves, letters, numbers, logos and the like.

FIG. 5A is a cross-sectional view of an article 100 that includes an aesthetic region 137 taken through section line 5A-5A of FIG. 5. The exemplary embodiment shown in FIG. 5A includes a aesthetic region that includes the outer surface 133 of the article 100 and a gradient wherein the density of bubbles per unit volume decreases towards the article wall inner surface.

FIG. 5B is a cross-sectional view of an alternate embodiment of the article 100. The exemplary embodiment shown in FIG. 5B includes a predetermined pattern that includes multiple aesthetic regions. As in FIG. 5A, the predetermined pattern includes a first aesthetic region 137 that includes the outer surface 133 of the article and a gradient wherein the density of oblong voids per unit volume decreases towards the article inner surface 132, and a second aesthetic region within the article wall (i.e. that does not include the outer surface).

As shown in FIG. 5B, the one or more aesthetic regions 1 disposed in the article 100 (e.g. the article wall) may have a layer-depth Da and an onset-depth Oa. In the Figure, the layer-depth Da represents the depth (or thickness) of the aesthetic region 137 in the article wall 130 in the direction normal to the article outer surface 133. Where the aesthetic region 137 includes the article outer surface 133 (as in FIG. 5A), the aesthetic region layer-depth can be taken from the article outer surface. Where the aesthetic region 137 includes the article outer surface 33 (as in FIG. 5A), the aesthetic region onset-depth, Da, is zero.

The onset-depth, Oa, of the one or more aesthetic region 137 in the article 100 may be greater than zero, that is to say, the one or more aesthetic region 137 may be disposed within the article wall 30 and that there may be a portion of the article wall outward of the aesthetic region that is essentially free from any oblong voids or aesthetic regions. The onset-depth of the one or more aesthetic region 137 is taken as the distance from the article outer surface 33 to the aesthetic region 137 taken in the direction normal to the article surface.

Typically, the layer-depth, Da, of the aesthetic region 137 in the article 100 is between 0.001 mm to 1.5 mm, but any suitable layer-depth, Da, can be used. Alternately, the layer-depth of the aesthetic region can be from about 0.01 mm to about 1.5 mm or about 0.01 mm to about 1 mm, or from about 0.025 mm to about 1 mm, or from about 0.025 mm to about 0.5 mm or from 0.1 mm to about 0.4 mm. Typically, the onset-depth, Oa, is between about 0 and 1.5 mm. Alternately, the onset-depth of the aesthetic region can be from about 0.0 mm to about 1.0 mm or about 0.001 mm to about 1 mm, or from about 0.01 mm to about 1 mm, or from about 0.01 mm to about 0.5 mm or from 0.1 mm to about 0.5 mm. Note that the when the aesthetic region is provided between the inner surface and the outer surface within an outermost 50% of the wall then the onset-depth plus the layer-depth cannot exceed half the value of the thickness of the wall of the article.

Alternately, the layer-depth of the aesthetic region can be expressed as a per-cent of the total wall thickness of the article in the portion of the article where it is disposed. For example, the layer-depth of the aesthetic region may be from about 0.0025% to about 50% of the thickness of the wall of the article, or from about 0.005% to about 30%, or from about 0.01% to about 30%, or from about 0.025% to about 10% or from 0.1% to about 3% or less. Typically, the onset-depth of the one or more aesthetic regions in the article, Oa, is between about 0 and 50% of the thickness of the wall of the article, or from about 0.0025% to about 20% or about 0.005% to about 10%, or from about 0.01% to about 10%, or from about 0.05% to about 5%.

Reducing the portion of the wall thickness that includes the aesthetic region (i.e. reducing Da as a per-cent of the wall thickness) contributes to the articles ability to retain its barrier properties despite including the aesthetic region. Said another way, by limiting the extent to which the article wall contains voids (e.g. by similarly limiting the extent to which the preform wall is foamed), the portion of the article wall that is essentially lacking voids is increased and the barrier properties of the wall are maintained as nearly similar to an article derived from a preform that had not undergone foaming. This can be expressed in terms of the density of the wall material. Specifically, the density of the portion of the article wall making up the aesthetic region is nearly similar to the density of the portion of the wall essentially lacking oblong voids. For example, the portion of the article wall making up the aesthetic region may have a density that is about 0.5% less than that of the portion of the article wall essentially lacking oblong voids. Alternately, the portion of the article wall making up the aesthetic region may have a density that is about 1%, or about 2% or about 5% less than that of the portion of the article wall essentially lacking oblong voids.

Figure 5C:
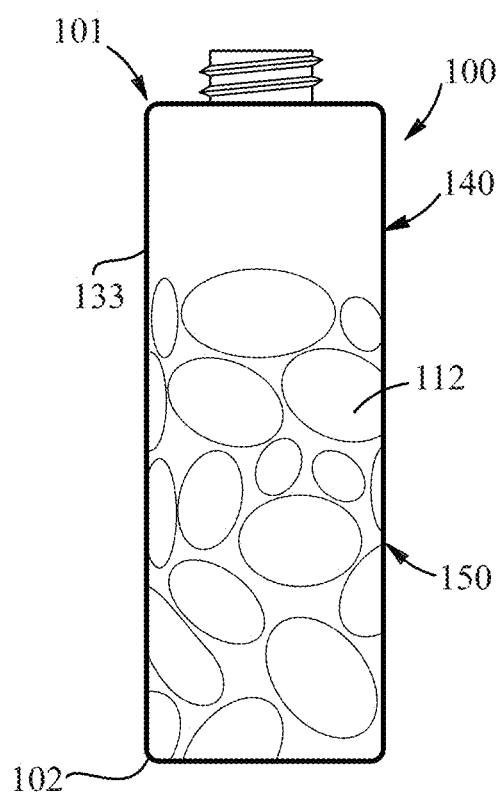
FIG. 5C is a plan view of an article.
Figure 5D:
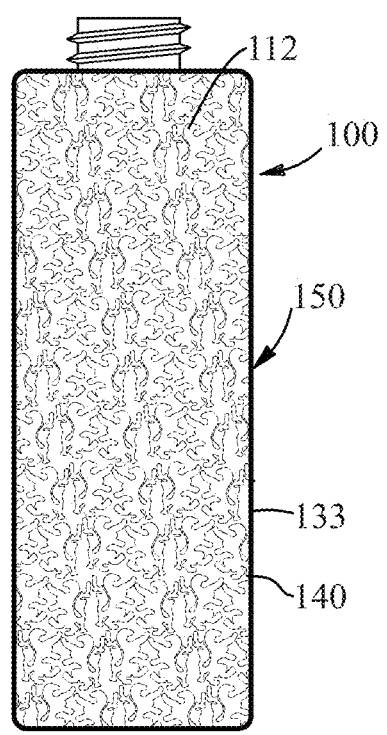
FIG. 5D is a plan view of an article.

FIG. 5C is a plan view of an article in accordance with the present invention. The exemplary embodiment shows article 100 that has a top 101, a bottom 102, a wall 150, and a first aesthetic region 112 formed in the outer layer 140. as well as a second aesthetic region formed in the intermediate layer 142. FIG. 5C is a plan view of an article in accordance with the present invention. The exemplary embodiment shows article 100 that has a wall 150, and a first aesthetic region 112 formed in the outer layer 140 that is visible through the outer surface 133 of the article 100.

Figure 7A:
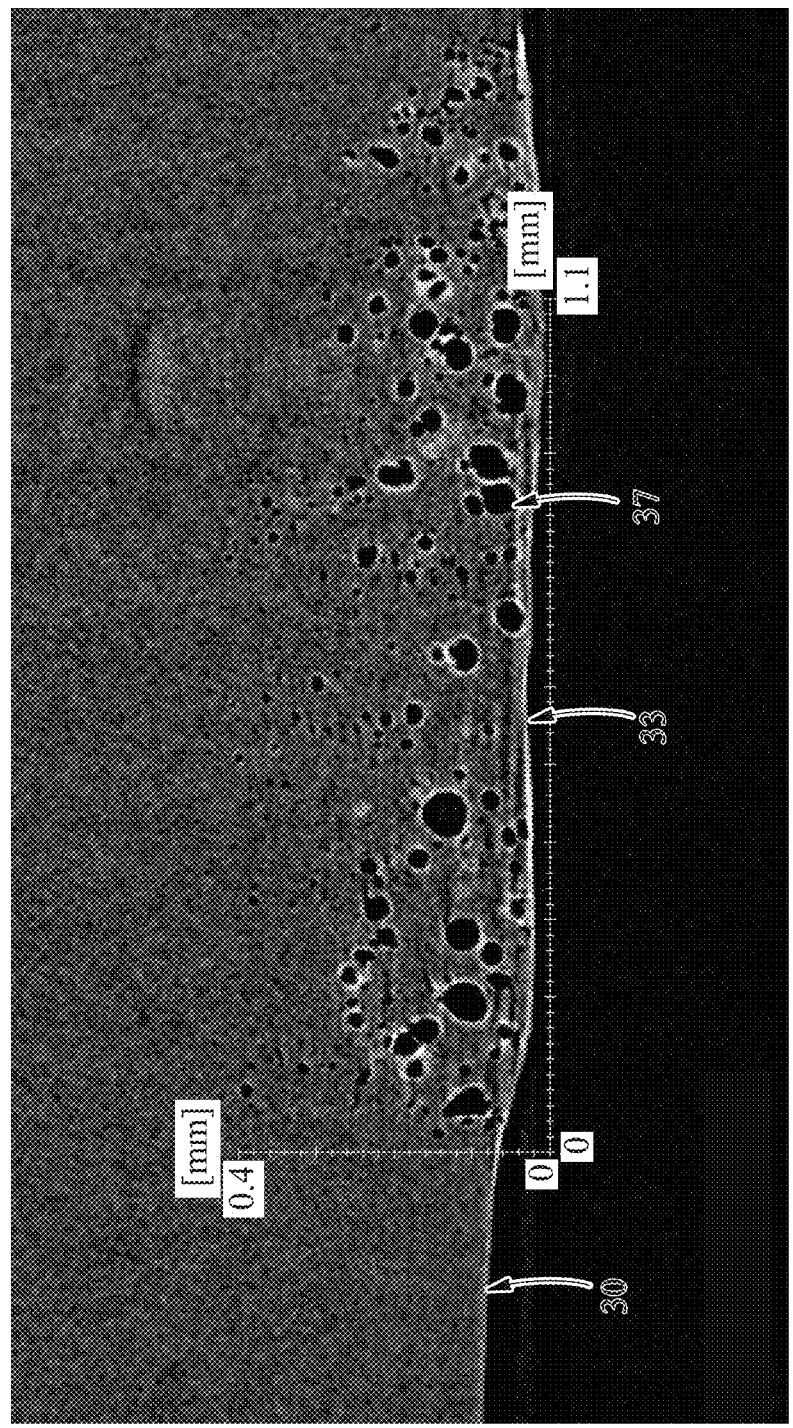
FIG. 7A is a uCT-scan of a cross-section of a preform.
Figure 7B:
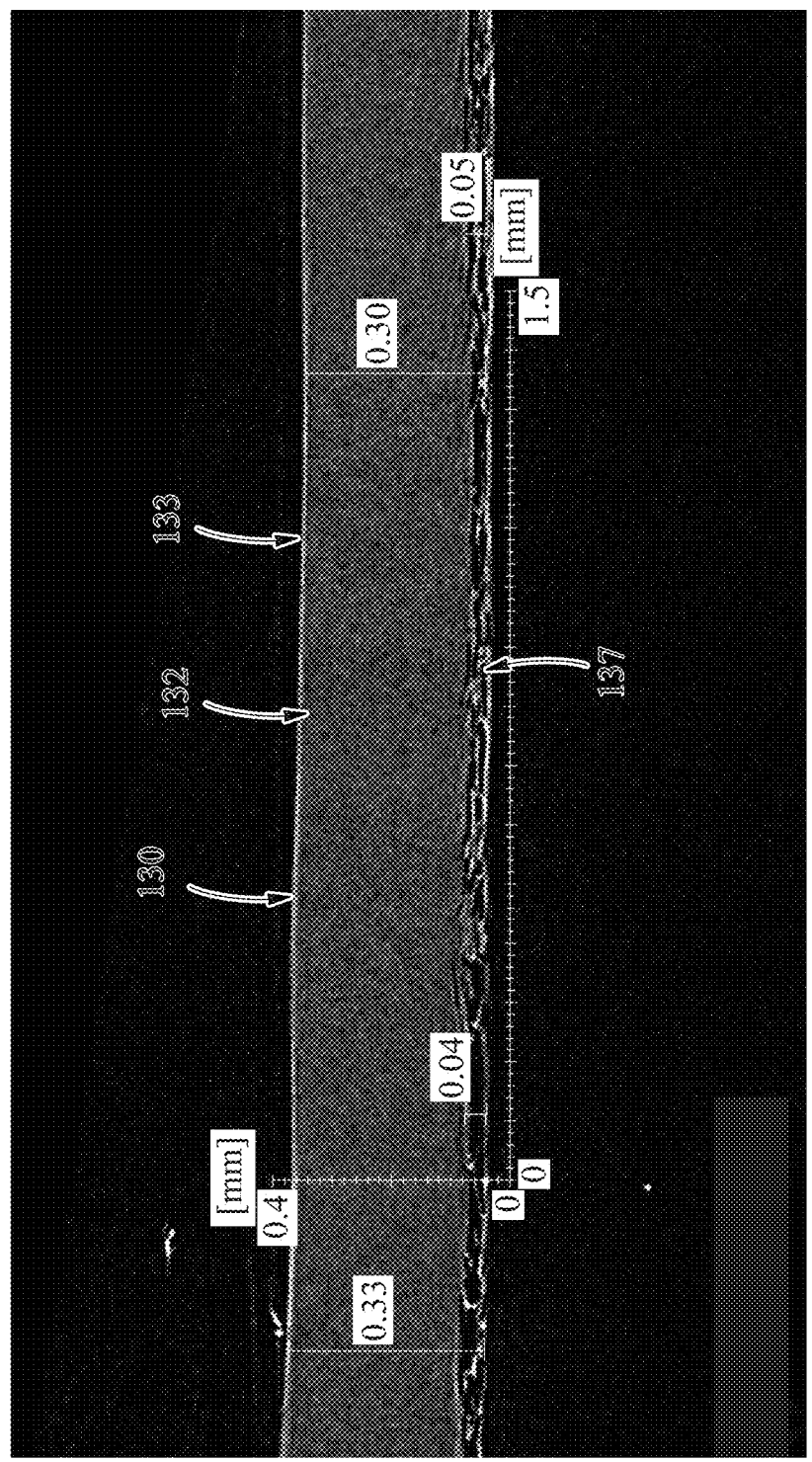
FIG. 7B is an SEM of a cross-section of an article.
Figure 8B:
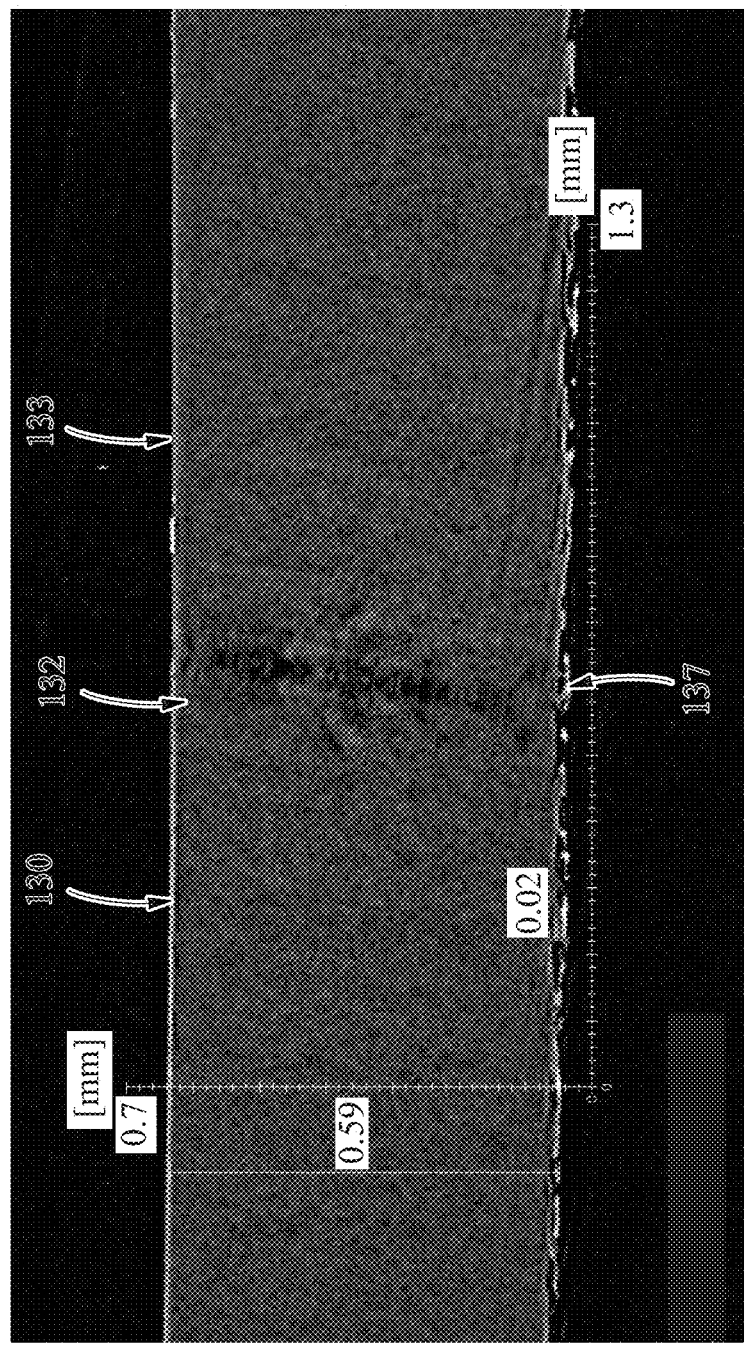
FIG. 8B is an SEM of an article in accordance with the present invention blow-molded from the preform of FIG. 7A.

FIGS. 7A, 7B, 8A, and 8B are analytical cross-sections of examples of preforms and articles, such as bottles, in accordance with the present invention. FIG. 7A shows a cross section of a wall of a preform (taken similar to cross-section line 3A-3A as depicted in FIG. 3A) that has been foamed with a laser. The image is a 2D slice from the 3D data set which was collected by using uCT. FIG. 7B shows a cross-section of a wall of an article (taken similar to cross-section line 5A-5A as depicted in FIG. 5A), formed by ISBM from a similar preform as that depicted in FIG. 6A. The image was taken using SEM. The aesthetic region 137 is formed by foaming the preform used to make the article 100, and then stretching the foamed preform, such as by blow-molding (e.g. by ISBM) the preform to form the bottle.

The stretching of the bubbles formed in the foamed region of the preform provides the aesthetic feature. That is, the oblong voids in the article, such as the bottle, are stretched relative to the bubbles as formed in the preform. Table 1 depicts the average dimensions of the bubbles in the preform and in the stretched articles for the examples depicted in FIGS. 5 and 6. As can be seen from the data in Table 1, the bubbles as formed in the preform are roughly spherical, with a length, L (taken as the average longest-distance across the bubbles), similar to the average thickness, T (shortest dimension across the bubbles taken orthogonally to the axis of L at the mid-point of L). Note that measurements for the bubbles in the preforms were taken using uCT analysis and that measurements for the oblong voids in the article were taken using SEM analysis, owing to the different resolution capabilities of the two methods.

TABLE 1

| Sample | Bubble length, L (μm) | Bubble thickness, T (μm) | Aspect Ratio, L/T |
|---|---|---|---|
| 1_Preform (45) | 20 | 20 | 1 |
| 1_Bottle (45) | 62 $^a$ | 5.5 $^a$ | 11.3 $^a$ |
| 2_Preform (90) | 14 | 14 | 1 |
| 2_Bottle (90) | 44 $^a$ | 3.3 $^a$ | 13.3$^a$ |

As shown in Table 2, the bubbles are flattened (i.e. the thickness is reduced) and widened (i.e. the length is increased) to yield the oblong voids as the preform is blown into the finished article. As such, the aspect ratio of the bubbles increases substantially. The predetermined pattern as formed in the preform, is generally translated and conserved in the article such as the bottle, but the bubbles that form the pattern are now flattened as oblong voids. The flattened bubbles provide the aesthetic feature in the article.

Specifically, the preform is foamed in a predetermined pattern and at a predetermined depth within the outmost 70% of the preform wall. The predetermined depth can be controlled so that only a fraction of the total wall-thickness of the preform, and thereby the article such as the bottle, is foamed. Foaming only a small portion of the wall thickness of the preform and/or article, provides that the integrity of the bottle, such as its strength and/or barrier properties, are maximally maintained. The preform may be foamed so that the foamed region comprises about 50% of the total wall thickness of the preform and/or the article. Alternately, the preform may be foamed so that the foamed region comprises only about 40%, 30%, 20%, 10%, 5%, or less than 5%, such as about 3% or less than about 3% of the total wall thickness of the preform and/or the article. The predetermined pattern may include regions that are foamed to one depth and regions that are foamed to a different depth. Table 3 depicts the depths of the preform foamed regions and the article aesthetic region for the examples depicted in FIGS. 7A-B and 8A-B.

TABLE 2

| Sample | Preform/Bottle wall thickness (mm) | Max Bubble Depth (mm) | % Bubble Thickness (relative to wall thickness) |
|---|---|---|---|
| 1_Preform (45) | 4 | 0.4 | 10 |
| 1_Bottle (45) | 0.33 | 0.05 | 15.2 |
| 2_Preform (90) | 4 | 0.1 | 2.5 |
| 2_Bottle (90) | 0.59 | 0.02 | 3.4 |

The depth to which the foamed region is formed in the preform can be manipulated by controlling the laser energy imposed on the preform (e.g. energy density, focal length of laser optics, etc.) and the extent to which the preform absorbs that energy. Specifically, high laser fluence (i.e. energy per unit area) and/or a shorter focal length can result in a deeper foamed region.

Separately, increased absorption of the laser energy by the preform can result in a shallower foamed region and resulting aesthetic region. For example, the incorporation of an absorption additive designed to absorb the wavelength of the laser energy can result in the energy of the laser being absorbed more efficiently. For example, an additive such as benzotriazoles and/or benzophenones may be used to improve the efficiency of absorption of UV laser energy. Alternately, additives such as carbon black, titanium nitride, antimony tin oxide (ATO), indium tin oxide (ITO), mica coated with ATO or ITO, cesium tungsten oxide, alkali tungsten oxides, tungsten sub-oxide, titanium sub-oxide, aluminum zinc oxide, metal nanoparticles, and complex metal oxides may be used to improve the efficiency of absorption of IR and near-IR laser energy.

By absorbing the energy more efficiently, the laser energy is not able to penetrate as deeply into the preform, and the foamed region will be formed nearer to the preform surface. The rate of foaming can also be improved by heating the preform 10 prior to and/or during the foaming step.

The foamed region 37 can be provided using more laser energy density (i.e. fluence) which may provide a deeper foamed region 37 and a darker coloration, as shown in FIG. 7A. The foamed region 37 shown in FIG. 7A penetrates further toward the inner surface 35 of the wall 150 than the foamed region 37 shown in FIG. 8A.

The foamed region 37 and/or aesthetic region 137 may depend from and/or be continuous with the outer surface of the preform and/or article, or may be contained within the material (e.g. wall, neck or base) of the preform and/or article and not continuous with the outer surface. The foamed region may be formed beneath the surface of the preform by sub-surface foaming which can be achieved by altering the focal length of the laser optics.

The article 100 may feel smooth to the touch over the predetermined pattern. The extent to which a particular surface is smooth can be expressed in terms of various different surface topography measurements. Two measurements that have been found to be particularly helpful in characterizing the surface topography of preforms and articles in accordance with the present invention are Maximum Peak/Pit Height (Sz) and Root Mean Square Roughness (Sq) as described below in the Measurement Methods section of this specification.

For example, it may be desirable to limit the Maximum Peak/Pit Height across some or all of the article outer surface 133 and/or the Root Mean Surface Roughness the to provide a surface that is desirable for printing, and/or labeling, or for other tactile, aesthetic or functional reasons. For example, it may be desirable for the Sz of some or all of the article outer surface 133 to be less than or equal to 750 microns, 500 microns, 250 microns, 200 microns, 150 microns, 100 microns, or 50 microns. Additionally, or alternatively, it may be desirable for some or all of the aesthetic regions 137 to have an Sq of a certain value or below. For example, it may be desirable for some or all of the aesthetic regions 137 to have an Sq of less than or equal to 10 microns, 8 microns, 5 microns, or 2 microns. As a result of the process used to form the predetermined feature 105, such as predetermined pattern 54, the inner surface 132 may have certain topological characteristics as well. For example, some or all of the aesthetic regions 137 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

Preforms 10 and articles 100 according to the invention can comprise layers and/or materials in layers with various functionalities. For example, an article 100 may have a barrier material layer or a recycled material layer between an outer thermoplastic layer and an inner thermoplastic layer. The article 100 may comprise, for example, additives typically in an amount of from 0.0001%, 0.001% or 0.01% to about 1%, 5% or 9%, by weight of the article. Non-limiting examples of functional materials include, but are not limited, to titanium dioxide, filler, cure agent, anti-statics, lubricant, UV stabilizer, anti-oxidant, anti-block agent, catalyst stabilizer, colorants, pigments, nucleating agent, laser absorbing additive and a combination thereof. It would be appreciated that while it is anticipated that these additives may be useful in the present invention, they may detract from the recyclability of the article.

Figure 9:
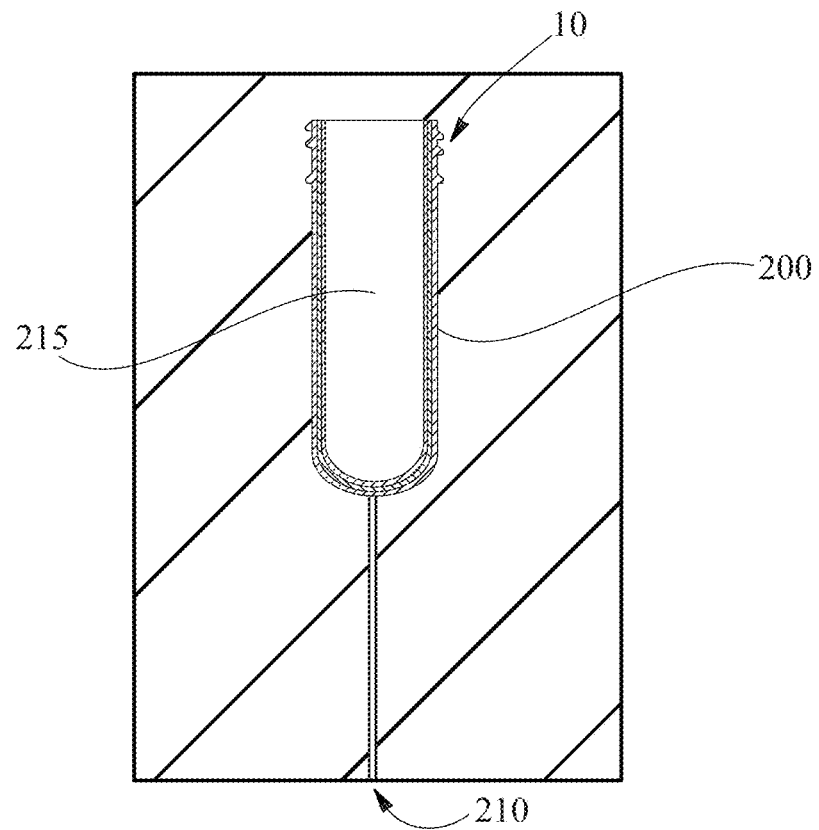
FIG. 9 is a plan view of a preform in an injection preform mold.

Method of Making Blow Molded Article:

As noted above, the article 100 of the present invention can be made by molding, including, but not limited to EBM, IBM or ISBM. In such methods, the article 100 is formed from a preform 10, such as the one shown in FIG. 1. The preform 10 can be made by any known means, including injection molding, 3D printing or any other suitable method. FIG. 9 shows an example of a preform 10 in an injection preform mold 200 after the material making up the preform 10 has been injected into the preform mold cavity 215 of the preform mold 200 and the preform 10 has been formed into the desired shape. The material making up the preform 10 is injected into the mold through orifice 210. After the material is cooled or otherwise modified such that the preform 10 can maintain its shape, the preform 10 is removed from the mold 200. The preform 10 may be subjected to any number of post-molding techniques, including, but not limited to chemical treatments, heating, cooling, light, mechanical manipulation, such as, for example, cutting, etching, scraping, bending, coating, etc. in addition to foaming. These techniques can help provide the preform 10 and/or final article 100 formed from the preform 10 with desired properties.

Figure 10:
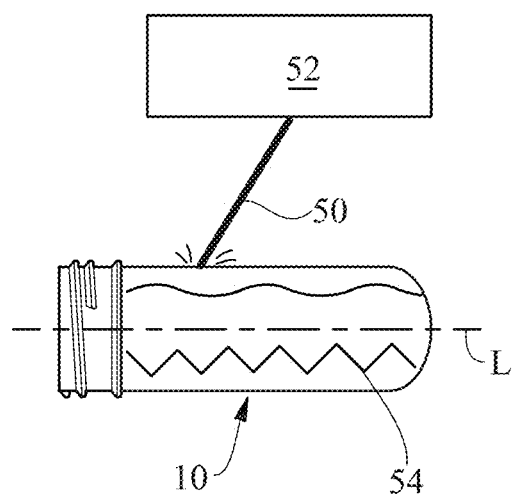
FIG. 10 is a plan view of a preform as it is being foamed by a laser.

In accordance with the present invention, the preform 10 may be provided with a predetermined pattern 54, such as, for example, in a pattern that includes at least one foamed region 37, after it is removed from the mold 200. As shown in FIG. 10, the preform 10 may be foamed by one or more lasers 52. The laser(s) 52 can direct one or more laser beams 50 to modify a portion of the preform wall 30, neck 14, or base. The material modification can create a foamed region 37 within the wall 30 of the preform 10. The foamed region 37 can extend to any portion of the outer surface 33 of the preform 10 and the foamed region 37 can include bubbles that are open to the outer surface 33 or entirely closed. The foamed region 37 does not extend past the outermost 70% of the wall 30. The modification process can take place at one time or in multiple different steps. The preform 10 may be rotated about its longitudinal axis L during foaming to allow the foaming device to foam about the circumference of the preform 10 or the foaming device may be rotated about the preform 10, or both can be rotated.

Figure 11:
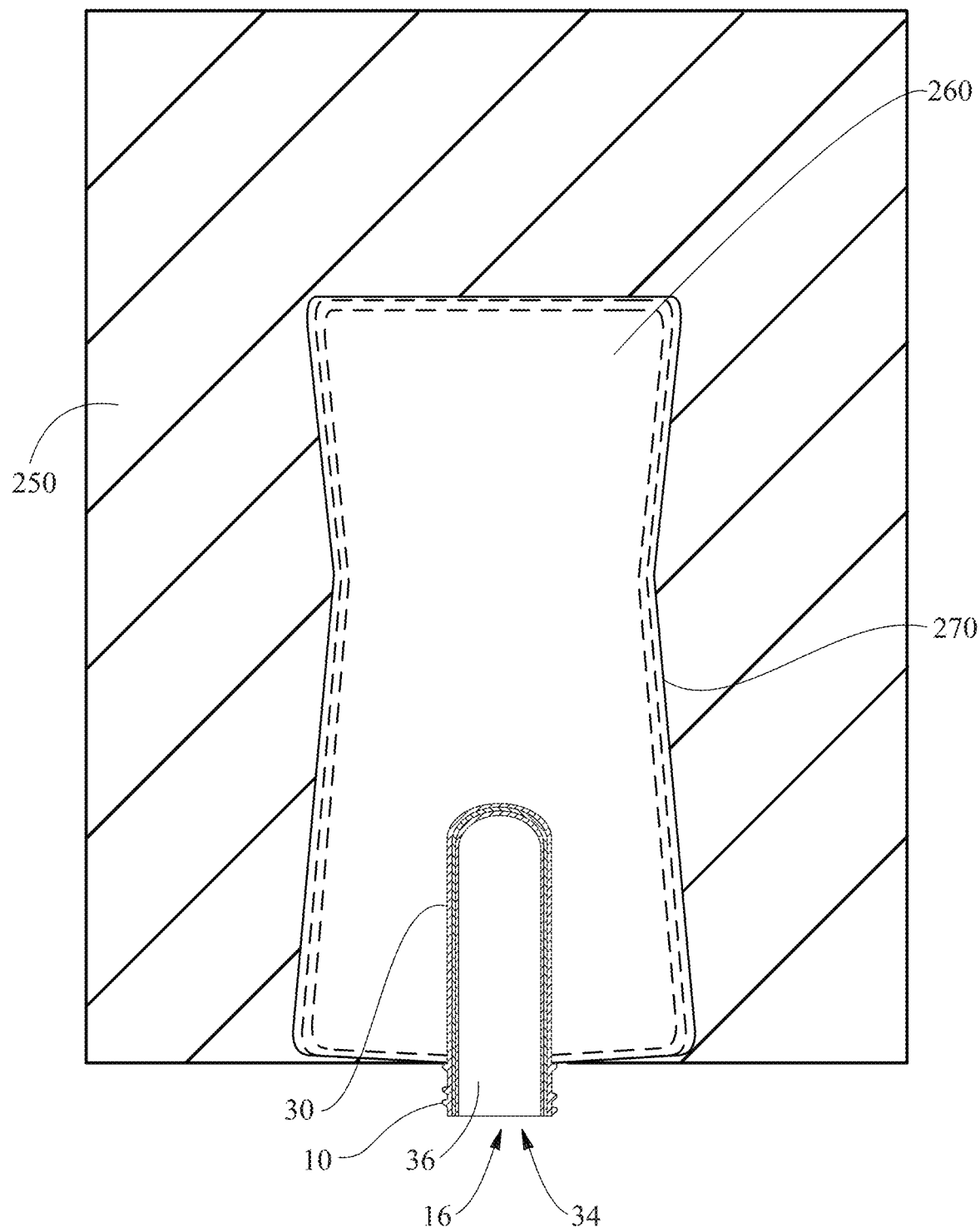
FIG. 11 is a plan view of a preform in a blow mold.

Once the desired number of foamed regions 37 are applied to the preform 10, the preform may be moved to a blow molding step to form the article 100 or may be stored or otherwise treated for different properties. Generally, just prior to the blow molding step, the preform 10 is heated or otherwise treated to soften it from a hardened state. This allows the preform 10 to be more easily blown into the shape of the article 100. Often, the preform 10 is heated by lamps, hot air, radiation or convection, but other methods of heating the preform 10 can be used. When the preform 10 is ready to be "blown" or expanded into the shape of the final article 100, it is placed into a blow mold, such as for example, the one shown in FIG. 11. The blow mold 250 has a cavity 260 formed by walls 270. The cavity 260 is generally in the shape of the article 100. The walls 270 may be smooth or may have some texture. The preform 10 in the mold 250 is expanded such that the walls, neck 14 and base 30 of the preform 10 take the shape of the cavity 260. The expanded preform may not fully contact the walls of the mold. Generally, the preform 10 is expanded by forcing air or another fluid into the opening 34 of the preform through the open end 16 of the preform. If desired, a vacuum created in the cavity 260 can assist the expansion of the preform 10. Once the preform 10 is expanded into the shape of the mold 250 and thus, the final article 100, the article 100 can be cooled and the blow mold 250 can be removed. The article 100 can be subjected to additional processing steps, including but not limited to inspection, removal of imperfections, cleaning, filling, labeling, printing, and sealing.

It is possible to configure the blowing process such that some or all of the foamed regions 37 create aesthetic regions 137 of the article 100, and to ensure that other physical/mechanical properties of the article are suitable. For example, it may be helpful to 1) minimize additional thermal crystallization on the external surface, 2) optimize the strain induced crystallization, and 2) set the material in the mold to avoid concave or convex surfaces in the transition from thick to thin surfaces.

For example, the article may be a bottle with a surface texture or a bottle having a smooth outer surface. The smoothness of the outer surface can be controlled within the blowing process. Such textural features can make the bottle more attractive and more consumer preferred. Additionally, because the article 100 can be provided with a smooth article outer surface 133, it can be more easily labeled and/or have printing more easily applied thereto. Further still, because the method provides a way to add a predetermined pattern 54 to the preform 10 (and resulting article) after it is out of the preform mold 200, it can significantly simplify the process for making complex features on the article 100. This also allows for the functional, textural and/or aesthetic features of the article 100 to be changed despite the preform 10 being from the same preform mold 200 and allows for much quicker and more efficient changes to the overall aesthetics, texture or functional features of the article 100 because new preform molds 200 are not needed if it is desired to change the resulting article 100. Thus, small productions batches and even customized articles become economically feasible.

Measurement Methods

Wall Thickness:

Wall thickness is measured with a digital micrometer (Shinwa 79523 Digital Micrometer, Shinwa Ltd, Japan) having an accuracy of +/−0.003 mm, at two or more locations in the region of the article where the wall thickness is to be measured.

MicroCT Method

Samples of the articles to be tested are imaged using a microCT X-ray scanning instrument capable of scanning a sample having dimensions of approximately 4 mm×4 mm×3 mm as a single dataset with contiguous voxels. An isotropic spatial resolution of 1.6 μm is required in the datasets collected by microCT scanning. MicroCT is measured using SCANCO Systems model μ50 microCT scanner (Scanco Medical AG, Brüttisellen, Switzerland) operated with the following settings: energy level of 55 kVp at 72 μA, 3600 projections, 7 mm field of view, 700 ms integration time, an averaging of 8, and a voxel size of 1.6 m.

Test samples to be analyzed are prepared by cutting a rectangular piece of the plastic from the wall with an Exacto knife and then further trimming the sample to approx. 4 mm in width using a fine tooth Exacto saw or fine surgical scissors with care to avoid causing cracks. The sample is positioned horizontally with mounting foam material and placed into a plastic cylindrical scanning tube and secured inside the microCT scanner. The instrument's image acquisition settings are selected such that the image intensity contrast is sensitive enough to provide clear and reproducible discrimination of the sample structures from the air and the surrounding mounting foam. Image acquisition settings that are unable to achieve this contrast discrimination or the required spatial resolution are unsuitable for this method. Scans of the plastic sample are captured such that a similar volume of each sample with its caliper is included in the dataset.

Software for conducting reconstructions of the dataset to generate 3D renderings is supplied by the scanning instrument manufacturer (Avizo Lite 1019.1, Visualization Sciences Group/FEI Company, Burlington, Massachusetts, U.S.A.). A representative 2D slice perpendicular to the surface is taken from the 3D data volume set near the center of foamed region (in the preform) or the aesthetic region 137 (in the article). A linear measurement tool available in Avizo is used to measure the distances. Note that preform bubbles are mainly isotropic with spherical shape while those of the blown bottle are significantly flattened due to stretching along the axial and circumferential directions. The bubble length or thickness of the foamed region (in the preform) is the distance from edge to edge of a representative bubble. The maximum bubble depth of the foamed region (in the preform) or aesthetic region (in the article) should appear as the deepest layer from the surface edge to a representative distance bubble in the slice. Due to stretching, the bubbles in the article are similar to the shape of pancakes or oblong voids, and from 2D cross-sectional views, they may appear as layers. The measurement is taken from a layer point furthest from the bottle edge, ending at a perpendicular angle to the bottle surface.

SEM Method

A region from a blown article that includes an aesthetic region is removed using sharp scissors or utility knife. A specimen of about 0.5 cm$^2$ or larger is removed from a portion of the article that has been stretched. The specimen includes both the exterior and interior wall surfaces as well as the material between them that includes the aesthetic region. The specimen is further cut parallel along the bottle height dimensions to generate a cross-sectional viewing plane using a sharp razor blade, preferably a single edge, PTFE-coated stainless-steel GEM® blade. The specimen is affixed to a cross-sectional SEM sample substrate using double sided conductive tape and conductive silver paint with the newly exposed cross-sectional viewing plane mounted for imaging with the electron beam. The mounted specimen is coated with a very thin conductive coating of gold/palladium using a Gatan Alto Cryo-Prep unit viewing in order to mitigate charging issues in SEM. The specimen was imaged using a Hitachi S-4700 Field Emission SEM.

Images are taken at adequate magnification to resolve the dimensions of the bubbles. 10 representative bubbles are measured for their longest and shortest dimensions via image measurement software such as Quartz PCI (Quartz Imaging Corporation, Vancouver, BC, Canada). The longest dimension of the oblong voids are measured first and reported as the length (L). The shortest dimension is taken orthogonally to the longest dimension at the mid-point of the long dimension. The shortest dimension is called the oblong void thickness (T).

Root Mean Square Roughness (Sq) and Maximum Peak/Pit Height (Sz):

Root Mean Square Roughness, Sq, and Maximum Peak/Pit Height, Sz, are measured using a 3D Laser Scanning Confocal Microscope such as a Keyence VK-X200 series microscope available from KEYENCE CORPORATION OF AMERICA) which includes a VK-X200K controller and a VK-X210 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. If needed, the manufacturer's image stitching software, VK Image Stitching version 2.1.0.0, can be used. The manufacturer's analysis software is compliant with ISO 25178. The light source used is a semiconductor laser with a wavelength of 408 nm and having a power of about 0.95 mW.

The sample to be analyzed is obtained by cutting a piece of the article out of the article that includes the region to be analyzed in a size that can fit the microscope for proper analysis. To measure Sq and Sz of a foamed portion of an article, a sample should be obtained that includes a foamed region and the analysis should take place only over the portion of the sample that is foamed. Similarly, to measure Sq and Sz of a non-foamed portion of an article, a sample should be obtained that includes a non-foamed region and the analysis should take place only over the portion of the sample that is not foamed. If the sample is not flat, but is flexible, the sample may be held down on the microscope stage with tape or other means. If, due to the shape, flexibility or other characteristic of the sample, measurements will be more accurate when the sample is not flattened, corrections may be used, as explained hereinbelow.

The measurement data from the sample is obtained using a 20× objective lens suitable for non-contact profilometry, such as a 20× Nikon CF IC Epi Plan DI Interferometry Objective with a numerical aperture of 0.40. The data is acquired using the acquisition software's "Expert Mode", with the following parameters set as described here: 1) Height Scan Range is set to encompass the height range of the sample (this can vary from sample to sample depending on the surface topography of each); 2) Z-direction Step Size is set to 0.50 micrometers; 3) Real Peak Detection mode is set to "On"; and 4) Laser Intensity and Detector Gain are optimized for each sample using the autogain feature of the instrument control software.

Surface texture parameters are obtained using ISO-25178-2:2012 compliant software following guidelines in the standard. For the examples shown here, 8 regions measuring 713×535 um with a resolution of 0.70 um/pixel were obtained; roughness parameters were calculated using the following conditions: 1) Gaussian filter with end effect correction enabled; 2) 2.5 um S-filter; 3) second order polynomial F-operation; and 4) 1 mm L-filter. Average values are shown in the table. S-filter, L-filter, and F-operation can be selected to correctly extract data for parameter calculation. For example, the F-operation can be used to remove sample form caused by bottle curvature that could not be removed prior to imaging; L-Filter can be used to remove waviness inherent to the bottle design.

Regions including foreign materials, artifacts of the sample harvesting process or any other obvious abnormalities should be excluded from analysis and alternative samples should be used if any sample can't be accurately measured. The resulting values are the Root Mean Square Roughness, Sq, and Maximum Peak/Pit Height, Sz, for the measured portion of the sample.

TABLE XX

|  | Sq µm | Sz µm |
|---|---|---|
| Bottle - Foamed Region | 2.84 | 50.03 |
| Bottle - Non-foamed Region | 0.21 | 17.02 |

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded article comprising:
    a body portion comprising one or more walls surrounding an interior space,
    the one or more walls having an inner surface, an outer surface, a wall thickness, a transparent portion, and one or more aesthetic regions comprising oblong voids provided between the inner surface and the outer surface within an outermost 20% of the wall, the one or more aesthetic regions being provided in a predetermined pattern;
    wherein the one or more aesthetic regions are bounded by a portion of the article essentially lacking oblong voids.

2. The article of claim 1, wherein the innermost 80% of the wall is essentially free from any aesthetic regions.

3. The article of claim 1, wherein the aesthetic region has a layer depth that is the thickness of the aesthetic region in a direction normal to the outer surface, and an onset depth that is the distance from the outer surface to the aesthetic region taken from a direction normal to the outer surface, wherein the onset depth is greater than zero and there is an un-foamed portion of the wall outward of the aesthetic region.

4. The article of claim 3, wherein the layer depth is between about 0.001 mm to about 2 mm from the outer surface and the onset depth is between about 0.1 mm and 2 mm from the outer surface.

5. The article of claim 3, wherein the layer depth is from about 0.0025% to about 50% of the thickness of the wall from the outer surface and the onset depth is from about 0.0025% to about 20% of the thickness of the wall from the outer surface.

6. The article of claim 1, the article having a plurality of aesthetic regions, each bounded by an un-foamed region.

7. The article of claim 1, the one or more aesthetic regions having more oblong voids at a boundary closest the outer surface and fewer oblong voids toward the inner surface.

8. The article of claim 1, wherein the oblong voids have an aspect ratio greater than 2.

* * * * *